United States Patent
Lhost et al.

(10) Patent No.: US 9,932,427 B2
(45) Date of Patent: Apr. 3, 2018

(54) PIPE COMPRISING A METALLOCENE-CATALYZED POLYETHYLENE RESIN

(71) Applicant: Total Research & Technology Feluy, Seneffe (BE)

(72) Inventors: Olivier Lhost, Havré (BE); Jacques Michel, Feluy (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 17 days.

(21) Appl. No.: 15/305,683

(22) PCT Filed: Apr. 23, 2015

(86) PCT No.: PCT/EP2015/058824
§ 371 (c)(1),
(2) Date: Oct. 21, 2016

(87) PCT Pub. No.: WO2015/162212
PCT Pub. Date: Oct. 29, 2015

(65) Prior Publication Data
US 2017/0058063 A1    Mar. 2, 2017

(30) Foreign Application Priority Data
Apr. 23, 2014 (EP) .................................. 14165701

(51) Int. Cl.
C08F 10/02 (2006.01)
C08L 23/06 (2006.01)
(Continued)

(52) U.S. Cl.
CPC ............ C08F 210/16 (2013.01); F16L 9/127 (2013.01); C08F 10/02 (2013.01); C08F 110/02 (2013.01);
(Continued)

(58) Field of Classification Search
None
See application file for complete search history.

(56) References Cited

U.S. PATENT DOCUMENTS

2011/0165357 A1* 7/2011 Backman ............... C08L 23/04
428/36.9
2013/0211018 A1 8/2013 Willocq et al.

FOREIGN PATENT DOCUMENTS

EP 2130863 A1 12/2009
WO 0105852 A1 1/2001
(Continued)

OTHER PUBLICATIONS

International Search Report issued in PCT/EP2015/058824, dated Jun. 9, 2015, 3 pages.

*Primary Examiner* — Richard A Huhn
(74) *Attorney, Agent, or Firm* — Albert Shung

(57) ABSTRACT

The invention relates to a pipe comprising at least one metallocene-catalyzed polyethylene resin, wherein the polyethylene resin has a multimodal molecular weight distribution and comprises at least two metallocene-catalyzed polyethylene fractions A and B, wherein fractions A and B are prepared in different reactors of at least two reactors connected in series, wherein the polyethylene resin comprises: at least 30% by weight and at most 50% by weight of the polyethylene fraction A, based on the total weight of the polyethylene resin, wherein fraction A has a melt index $MI_2$ of at least 50 g/10 min as determined on the fluff of fraction A according to ISO 1133:1997 condition D at a temperature of 190° C. and under a load of 2.16 kg; wherein fraction B has a density of at most 0.9210 g/cm³; and wherein the polyethylene resin has a melt index $MI_5$ of at least 0.10 g/10 min and of at most 1.0 g/10 min as determined according to ISO 1133:1997, condition T, at 190° C. and under a load of 5 kg; wherein the polyethylene (Continued)

resin has an HLMI of at least 4.0 g/10 min and at most 14.0 g/10 min, as measured according to the procedure of ISO 1133:1997 condition G with a temperature of 190° C. and a load of 21.6 kg; and a density of at least 0.9420 g/cm$^3$ and of at most 0.9460 g/cm$^3$ as determined according to the procedure of ASTM D-1505 at a temperature of 23° C.

15 Claims, 4 Drawing Sheets

(51) Int. Cl.
    *C08F 210/16*      (2006.01)
    *F16L 9/127*      (2006.01)
    *C08F 210/02*      (2006.01)
    *C08F 110/02*      (2006.01)

(52) U.S. Cl.
    CPC ........ *C08F 210/02* (2013.01); *C08F 2500/05* (2013.01); *C08L 2205/025* (2013.01); *C08L 2308/00* (2013.01); *C08L 2314/06* (2013.01)

(56) References Cited

FOREIGN PATENT DOCUMENTS

| WO | 2008113680 A1 | 9/2008 |
| WO | 2014016318 A1 | 1/2014 |

\* cited by examiner

PIPE COMPRISING A METALLOCENE-CATALYZED POLYETHYLENE RESIN

CROSS-REFERENCE TO RELATED APPLICATIONS

This application claims the benefit of PCT/EP2015/058824, filed Apr. 23, 2015, which claims priority from EP 14165701.5, filed Apr. 23, 2014.

FIELD OF THE INVENTION

The invention relates to pipes comprising metallocene-catalyzed polyethylene resins; preferably pipes comprising a multimodal metallocene-catalyzed polyethylene resin.

BACKGROUND OF THE INVENTION

Polymer materials are frequently used for preparing pipes suitable for various purposes, such as fluid transport, i.e. transport of liquid or gas, e.g. water or natural gas, during which the fluid can be pressurized. Moreover, the transported fluid may have varying temperatures. These pipes are usually prepared from polyolefins, such as medium density polyethylene and high density polyethylene.

Polyethylene (PE) pipes are generally manufactured by extrusion, or by injection moulding. The properties of such conventional PE pipes produced by extrusion or injection moulding are sufficient for many purposes, although enhanced properties may be desired, for instance in applications requiring high pressure resistance, i.e. pipes that are subjected to an internal fluid pressure for a long and/or short period of time.

According to ISO 9080, PE pipes are classified by their minimum required strength, i.e. their capability to withstand different hydrostatic (hoop) stress during 50 years at 20° C. without fracturing. The standard provides a definitive procedure incorporating an extrapolation using test data at different temperatures analyzed by multiple linear regression analysis. The results permit the determination of material-specific design values in accordance with the procedures described in the relevant system standards. This multiple linear regression analysis is based on the rate processes most accurately described by $\log_{10}(stress)$ versus $\log_{10}(time)$ models. Thereby, pipes withstanding a hoop stress of 8.0 MPa (minimum required strength MRS8.0) are classified as PE80 pipes, and pipes withstanding a hoop stress of 10.0 MPa (MRS10.0) are classified as PE100 pipes.

Advanced pipe materials should nowadays conform to pressure resistance levels higher than PE80. One attempt to meet these requirements has been the increase of the density of the polyolefin composition used for such pressure pipes. However, by increasing the density, slow crack growth resistance (SCGR) is reduced which will result in earlier brittle failure and thus has a negative impact on the minimum required strength (MRS) rating as well. The density increase also induces a flexibility decrease.

Further properties which are desirable to improve or to maintain at a high level are processability, tensile modulus, short term pressure resistance, and impact properties of the pipe material.

It is today difficult to produce a flexible pipe which can withstand high pressure for long times while at the same time satisfying criteria of processing, slow crack growth resistance, and cold temperature impact strength of PE100 class materials.

Therefore, it is an object underlying the present invention to provide pipes comprising polyethylene resins which can withstand high pressures for long times while at the same time satisfying criteria of processing, slow crack growth resistance, and cold temperature impact strength of PE100 class materials.

SUMMARY OF THE INVENTION

It is the finding of the present invention that the above object can be achieved by a pipe as presently claimed.

According to a first aspect, the invention provides a pipe comprising at least one metallocene-catalyzed polyethylene resin, wherein the polyethylene resin has a multimodal molecular weight distribution and comprises at least two metallocene-catalyzed polyethylene fractions A and B, wherein fractions A and B are prepared in different reactors of at least two reactors connected in series, wherein the polyethylene resin comprises:

at least 30% by weight and at most 50% by weight of the polyethylene fraction A, based on the total weight of the polyethylene resin, wherein fraction A has a melt index $MI_2$ of at least 50 g/10 min as determined on the fluff of fraction A according to ISO 1133:1997 condition D at a temperature of 190° C. and under a load of 2.16 kg;

wherein the polyethylene resin has a melt index $MI_5$ of at least 0.10 g/10 min and of at most 1.0 g/10 min as determined according to ISO 1133:1997, condition T, at 190° C. and under a load of 5 kg; and a density of at least 0.9420 g/cm$^3$ and of at most 0.9460 g/cm$^3$, preferably of at most 0.9455 g/cm$^3$, as determined according to the procedure of ASTM D-1505 at a temperature of 23° C. Preferably, fraction B has a density of at most 0.9210 g/cm$^3$, preferably of at most 0.9200 g/cm$^3$.

Preferably, the invention provides a pipe comprising at least one metallocene-catalyzed polyethylene resin, wherein the polyethylene resin has a multimodal molecular weight distribution and comprises at least two metallocene-catalyzed polyethylene fractions A and B, wherein fractions A and B are prepared in different reactors of at least two reactors connected in series, wherein the polyethylene resin comprises:

at least 30% by weight and at most 50% by weight of the polyethylene fraction A, based on the total weight of the polyethylene resin, wherein fraction A has a melt index $MI_2$ of at least 50 g/10 min as determined on the fluff of fraction A according to ISO 1133:1997 condition D at a temperature of 190° C. and under a load of 2.16 kg;

wherein fraction B has a density of at most 0.9210 g/cm$^3$, preferably of at most 0.9200 g/cm$^3$; and wherein the polyethylene resin has a melt index $MI_5$ of at least 0.10 g/10 min and of at most 1.0 g/10 min as determined according to ISO 1133:1997, condition T, at 190° C. and under a load of 5 kg; and a density of at least 0.9420 g/cm$^3$ and of at most 0.9460 g/cm$^3$, preferably of at most 0.9455 g/cm$^3$, as determined according to the procedure of ASTM D-1505 at a temperature of 23° C.

Preferably, the sum of the weight percentages of fractions A and B in the polyethylene resin add up to 100.0%, and therefore the resin preferably comprises at least 50% and at most 70% by weight of fraction B. The skilled person will also realize that the percentages of fraction A and B may be further restricted by the restrictions imposed on the properties of the final resin (such as density) combined with the properties of the individual fractions (such as density or melt index) as claimed. Preferred percentages of both fractions are provided in the description.

The present invention also encompasses a pipe comprising at least one metallocene-catalyzed polyethylene resin, wherein the polyethylene resin has a multimodal molecular weight distribution and comprises at least two metallocene-catalyzed polyethylene fractions A and B, wherein fractions A and B are prepared in different reactors of at least two reactors connected in series, wherein the polyethylene resin comprises:

at least 30% by weight and at most 50% by weight of the polyethylene fraction A, based on the total weight of the polyethylene resin, wherein fraction A has a melt index $MI_2$ of at least 50 g/10 min as determined on the fluff of fraction A according to ISO 1133:1997 condition D at a temperature of 190° C. and under a load of 2.16 kg;

wherein the polyethylene resin has an HLMI of at least 2.0 g/10 min and at most 20.0 g/10 min, preferably of at least 4.0 g/10 min and at most 14.0 g/10 min, preferably of at least 7.0 g/10 min and at most 13.0 g/10 min, preferably of at least 9.0 g/10 min and at most 12.0 g/10 min, as measured according to the procedure of ISO 1133:1997 condition G with a temperature of 190° C. and a load of 21.6 kg; and has a density of at least 0.9420 g/cm$^3$ and of at most 0.9460 g/cm$^3$, preferably of at most 0.9455 g/cm$^3$, as determined according to the procedure of ASTM D-1505 at a temperature of 23° C. Preferably, the polyethylene resin has an HLMI of at most 14.0 g/10 min, the HLMI being determined according to the procedure of ISO 1133:1997 condition G with a temperature of 190° C. and a load of 21.6 kg, for example an HLMI of at least 4.0 g/10 min and at most 14.0 g/10 min. Preferably, the polyethylene resin has a melt index $MI_5$ of at least 0.10 g/10 min and of at most 1.0 g/10 min as determined according to ISO 1133:1997, condition T, at 190° C. and under a load of 5 kg. Preferably, fraction B has a density of at most 0.9210 g/cm$^3$, preferably of at most 0.9200 g/cm$^3$.

Preferably, the invention encompasses a pipe comprising at least one metallocene-catalyzed polyethylene resin, wherein the polyethylene resin has a multimodal molecular weight distribution and comprises at least two metallocene-catalyzed polyethylene fractions A and B, wherein fractions A and B are prepared in different reactors of at least two reactors connected in series, wherein the polyethylene resin comprises:

at least 30% by weight and at most 50% by weight of the polyethylene fraction A, based on the total weight of the polyethylene resin, wherein fraction A has a melt index $MI_2$ of at least 50 g/10 min as determined on the fluff of fraction A according to ISO 1133:1997 condition D at a temperature of 190° C. and under a load of 2.16 kg;

wherein the polyethylene resin has a melt index $MI_5$ of at least 0.10 g/10 min and of at most 1.0 g/10 min as determined according to ISO 1133:1997, condition T, at 190° C. and under a load of 5 kg; an HLMI of at least 4.0 g/10 min and at most 14.0 g/10 min, as measured according to the procedure of ISO 1133:1997 condition G with a temperature of 190° C. and a load of 21.6 kg; and a density of at least 0.9420 g/cm$^3$ and of at most 0.9460 g/cm$^3$, preferably of at most 0.9455 g/cm$^3$, as determined according to the procedure of ASTM D-1505 at a temperature of 23° C. Preferably, fraction B has a density of at most 0.9210 g/cm$^3$, preferably of at most 0.9200 g/cm$^3$.

According to a second aspect, the invention provides at least one metallocene-catalyzed polyethylene resin, wherein the polyethylene resin has a multimodal molecular weight distribution and comprises at least two metallocene-catalyzed polyethylene fractions A and B, wherein fractions A and B are prepared in different reactors of at least two reactors connected in series, wherein the polyethylene resin comprises:

at least 30% by weight and at most 50% by weight of the polyethylene fraction A, based on the total weight of the polyethylene resin, wherein fraction A has a melt index $MI_2$ of at least 50 g/10 min as determined on the fluff of fraction A according to ISO 1133:1997 condition D at a temperature of 190° C. and under a load of 2.16 kg;

wherein the polyethylene resin has a melt index $MI_5$ of at least 0.10 g/10 min and of at most 1.0 g/10 min as determined according to ISO 1133:1997, condition T, at 190° C. and under a load of 5 kg; an HLMI of at most 14.0 g/10 min, the HLMI being determined according to the procedure of ISO 1133:1997 condition G with a temperature of 190° C. and a load of 21.6 kg; and a density of at least 0.9420 g/cm$^3$ and of at most 0.9460 g/cm$^3$, preferably of at most 0.9455 g/cm$^3$, as determined according to the procedure of ASTM D-1505 at a temperature of 23° C. Preferably, the polyethylene resin has an HLMI of at least 4.0 and at most 14.0 g/10 min, the HLMI being determined according to the procedure of ISO 1133:1997 condition G with a temperature of 190° C. and a load of 21.6 kg. Preferably, the polyethylene resin has a molecular weight distribution Mw/Mn of at least 5.0, preferably of at least 6.0, Mw being the weight-average molecular weight and Mn being the number-average molecular weight. Preferably, fraction B has a density of at most 0.9210 g/cm$^3$, preferably of at most 0.9200 g/cm$^3$.

The present invention encompasses a metallocene-catalyzed polyethylene resin, having a multimodal molecular weight distribution and comprising at least two metallocene-catalyzed polyethylene fractions A and B, wherein fractions A and B are prepared in different reactors of at least two reactors connected in series, wherein the metallocene-catalyzed polyethylene resin comprises:

at least 30% by weight and at most 50% by weight of the polyethylene fraction A, based on the total weight of the polyethylene resin, wherein fraction A has a melt index $MI_2$ of at least 50 g/10 min as determined on the fluff of fraction A according to ISO 1133:1997 condition D at a temperature of 190° C. and under a load of 2.16 kg;

wherein the polyethylene resin has an HLMI of at least 4.0 g/10 min and at most 14.0 g/10 min, preferably of at least 7.0 g/10 min and at most 13.0 g/10 min, preferably of at least 9.0 g/10 min and at most 12.0 g/10 min, as measured according to the procedure of ISO 1133:1997 condition G with a temperature of 190° C. and a load of 21.6 kg; and has a density of at least 0.9420 g/cm$^3$ and of at most 0.9460 g/cm$^3$, preferably of at most 0.9455 g/cm$^3$, as determined according to the procedure of ASTM D-1505 at a temperature of 23° C. Preferably, the polyethylene resin has an HLMI of at least 4.0 and at most 14.0 g/10 min, the HLMI being determined according to the procedure of ISO 1133:1997 condition G with a temperature of 190° C. and a load of 21.6 kg. Preferably, the polyethylene resin has a molecular weight distribution $M_w/M_n$ of at least 5.0, preferably of at least 7.0, Mw being the weight-average molecular weight and Mn being the number-average molecular weight. Preferably, fraction B has a density of at most 0.9210 g/cm$^3$, preferably of at most 0.9200 g/cm$^3$.

The present inventors have shown that the claimed pipes can withstand high stresses for long times while at the same time satisfying criteria of processing, slow crack growth resistance, and cold temperature impact strength of PE100 class materials. Surprisingly the pipes can exhibit higher long term hydrostatic strength than expected when using polyethylene resins having the claimed density.

The present inventors have found that the pipes are resistant to high temperatures, making them suitable for use in hot water distribution. The present inventors have found that the pipes show little to no sag, making the polyethylene resin useful for pipes with a larger diameter. The present inventors have found that the pipes are flexible, and may be adapted to be rolled up, preferably to a smaller radius than classical PE100 class materials.

The independent and dependent claims set out particular and preferred features of the invention. Features from the dependent claims may be combined with features of the independent or other dependent claims as appropriate. The present invention will now be further described. In the following passages, different aspects of the invention are defined in more detail. Each aspect so defined may be combined with any other aspect or aspects unless clearly indicated to the contrary.

In particular, any feature indicated as being preferred or advantageous may be combined with any other feature or features indicated as being preferred or advantageous.

All characteristics described hereunder for the polyethylene resin for use in the pipe according to the first aspect of the invention apply also mutatis mutandis to the pipe according to the third aspect of the invention and to the resins according to the second and fourth aspects of the invention.

DETAILED DESCRIPTION OF THE INVENTION

Figure 1:
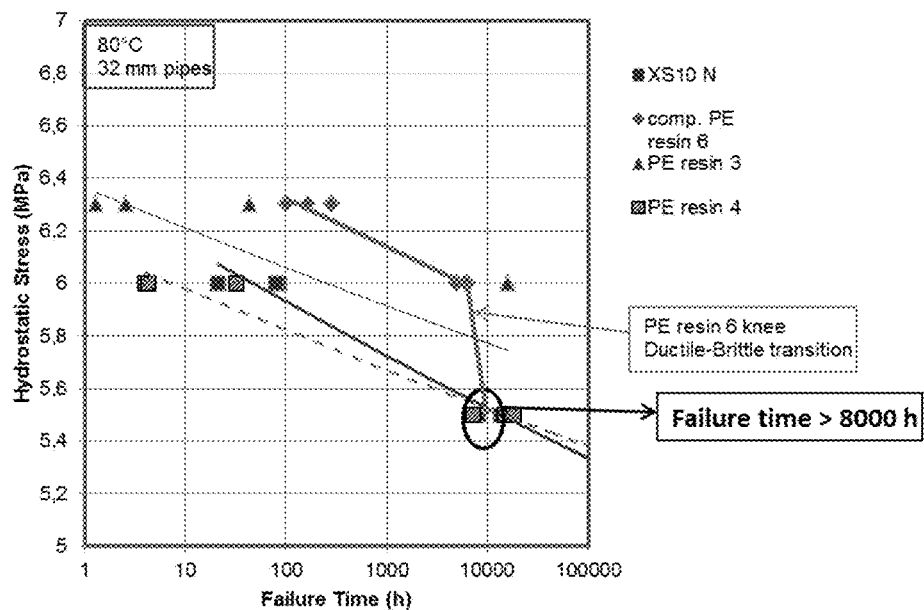
FIG. 1 represents a graph plotting the hydrostatic stress versus failure time for 32 mm pipes under hydrostatic pressure at 80° C. made from polyethylene resin 3, polyethylene resin 4, comparative polyethylene resin 6, and commercial resin XS10N, respectively.

When describing the invention, the terms used are to be construed in accordance with the following definitions, unless the context dictates otherwise.

As used herein, the singular forms "a", "an", and "the" include both singular and plural referents unless the context clearly dictates otherwise. By way of example, "a resin" means one resin or more than one resin.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Preferred statements (features) and embodiments of the pipes and resins and processes of this invention are now set forth. Each statement and embodiment of the invention so defined may be combined with any other statement and/or embodiments unless clearly indicated to the contrary. In particular, any feature indicated as being preferred or advantageous may be combined with any other feature or features indicated as being preferred or advantageous.

Numbered statements of this invention are:
1. A pipe comprising at least one metallocene-catalyzed polyethylene resin, wherein the polyethylene resin has a multimodal molecular weight distribution and comprises at least two metallocene-catalyzed polyethylene fractions A and B, wherein fractions A and B are prepared in different reactors of at least two reactors connected in series, wherein the polyethylene resin comprises:
   at least 30% by weight and at most 50% by weight of the polyethylene fraction A, based on the total weight of the polyethylene resin,
   preferably wherein fraction A has a melt index $MI_2$ of at least 50 g/10 min as determined on the fluff of fraction A according to ISO 1133:1997 condition Data temperature of 190° C. and under a load of 2.16 kg:
preferably wherein the polyethylene resin has a melt index $MI_5$ of at least 0.10 g/10 min and of at most 1.0 g/10 min, preferably at least 0.15 g/10 min and at most 0.80 g/10 min, preferably at least 0.15 g/10 min and at most 0.60 g/10 min, as determined according to ISO 1133:1997, condition T, at 190° C. and under a load of 5 kg;
wherein the polyethylene resin has a density of at least 0.9420 g/cm$^3$ and of at most 0.9460 g/cm$^3$, preferably of at most 0.9455 g/cm$^3$, as determined according to the procedure of ASTM D-1505 at a temperature of 23° C., preferably wherein fraction B has a density of at most 0.9210 g/cm$^3$, for example of at most 0.9200 g/cm$^3$.

2. A pipe comprising at least one metallocene-catalyzed polyethylene resin, wherein the polyethylene resin has a multimodal molecular weight distribution and comprises at least two metallocene-catalyzed polyethylene fractions A and B, wherein fractions A and B are prepared in different reactors of at least two reactors connected in series, wherein the polyethylene resin comprises:
at least 30% by weight and at most 50% by weight of the polyethylene fraction A, based on the total weight of the polyethylene resin, wherein fraction A has a melt index $MI_2$ of at least 50 g/10 min as determined on the fluff of fraction A according to ISO 1133:1997 condition D at a temperature of 190° C. and under a load of 2.16 kg;
wherein the polyethylene resin has an HLMI of at least 4.0 g/10 min and at most 14.0 g/10 min, preferably of at least 7.0 g/10 min and at most 13.0 g/10 min, preferably of at least 9.0 g/10 min and at most 12.0 g/10 min, as measured according to the procedure of ISO 1133:1997 condition G with a temperature of 190° C. and a load of 21.6 kg; and
wherein the polyethylene resin has a density of at least 0.9420 g/cm$^3$ and of at most 0.9460 g/cm$^3$, preferably of at most 0.9455 g/cm$^3$, as determined according to the procedure of ASTM D-1505 at a temperature of 23° C., preferably wherein fraction B has a density of at most 0.9210 g/cm$^3$, for example of at most 0.9200 g/cm$^3$.

3. The pipe according to any one of statements 1 or 2, wherein the polyethylene resin has a melt index $MI_5$ of at least 0.10 g/10 min and of at most 1.0 g/10 min, preferably at least 0.15 g/10 min and at most 0.80 g/10 min, preferably at least 0.15 g/10 min and at most 0.60 g/10 min, as determined according to ISO 1133:1997, condition T, at 190° C. and under a load of 5 kg; and an HLMI of at least 4.0 g/10 min and at most 14.0 g/10 min, preferably of at least 7.0 g/10 min and at most 13.0 g/10 min, as measured according to the procedure of ISO 1133:1997 condition G with a temperature of 190° C. and a load of 21.6 kg.

4. The pipe according to any one of statements 1 to 3, wherein fraction B is a polyethylene copolymer, which is a copolymer of ethylene and at least one C3-C12-alpha olefin, preferably 1-hexene.

5. The pipe according to any one of statements 1 to 4, wherein polyethylene fraction A has a density as measured on the fluff of at least 0.0050 g/cm$^3$ higher than the density of the metallocene-catalyzed polyethylene resin, preferably of at least 0.007 g/cm$^3$ higher than the density of the polyethylene resin, preferably of at least 0.008 g/cm$^3$ higher than the density of the polyethylene resin, preferably of at least 0.010 g/cm$^3$ higher than the density of the polyethylene resin, preferably of at least 0.015 g/cm$^3$ higher than the density of the polyethylene resin, of at least 0.020 g/cm$^3$ higher than the density of the polyethylene resin.

6. The pipe according to any one of statements 1 to 5, wherein the metallocene-catalyzed polyethylene resin has an HLMI of at least 4.0 g/10 min and at most 14.0 g/10 min as determined using the procedure of ISO 1133:1997 Condition G at a temperature of 190° C. and under a load of 21.6 kg, preferably of at least 5.0 g/10 min and at most 14.0 g/10 min, preferably of at least 6.0 g/10 min and at most 14.0 g/10 min, preferably of at least 7.0 g/10 min and at most 13.0 g/10 min, preferably of at least 9.0 g/10 min and at most 12.0 g/10 min.

7. The pipe according to any one of statements 1 to 6, wherein the ratio of the HLMI of the polyethylene resin to the HLMI of the polyethylene fraction B is at most 50, the HLMI of the polyethylene resin being determined according to the procedure of ISO 1133:1997 condition G with a temperature of 190° C. and a load of 21.6 kg, wherein when fraction B is prepared in the second reactor of at least two reactors connected in series the HLMI of the polyethylene fraction B is calculated.

8. The pipe according to any one of statements 1 to 7, comprising at least 50% by weight and at most 70% by weight of polyethylene fraction B.

9. The pipe according to any one of statements 1 to 8, wherein the ratio of the HLMI of the metallocene-catalyzed polyethylene resin to the HLMI of polyethylene fraction B is at most 100, preferably at most 90, preferably at most 80, preferably at most 70, preferably at most 60, preferably at most 50, preferably at most 40, the HLMI of the polyethylene resin being measured according to the procedure of ISO 1133:1997 condition G with a temperature of 190° C. and a load of 21.6 kg, the HLMI of the polyethylene fraction B being calculated when fraction B is prepared in the second reactor of at least two reactors connected in series; preferably the ratio of the HLMI of the metallocene-catalyzed polyethylene resin to the HLMI of polyethylene fraction B is at least 10 and at most 50; more preferably, the ratio of the HLMI of the polyethylene resin to the HLMI of the polyethylene fraction B is at least 10 and at most 50, preferably at least 20 and at most 45, preferably at least 25 and at most 45, preferably at least 30 and at most 45.

10. The pipe according to any one of statements 1 to 9, wherein polyethylene fraction A has an $MI_2$ of at least 50 g/10 min and of at most 1000 g/10 min, preferably at least 60 g/10 min and of at most 500 g/10 min, preferably at least 70 g/10 min and of at most 300 g/10 min, preferably at least 70 g/10 min and of at most 250 g/10 min, preferably at least 80 g/10 min and of at most 250 g/10 min, preferably at least 80 g/10 min and of at most 230 g/10 min, preferably at least 80 g/10 min and of at most 200 g/10 min; preferably polyethylene fraction A has an $MI_2$ of at least 60 g/10 min, preferably of at least 70 g/10 min, preferably of at least 80 g/10 min.

11. The pipe according to any one of statements 1 to 10, wherein the metallocene-catalyzed polyethylene resin has a molecular weight distribution Mw/Mn of at least 5.0; preferably of at least 5.0 and at most 40.0, preferably of at least 5.0 and at most 30.0, preferably of at least 5.0 and of at most 25.0, preferably of at least 5.0 and of at most 20.0, preferably of at least 5.0 and of at most 15.0, preferably of at least 5.0 and of at most 14.0, preferably of at least 5.0 and of at most 12.0, for example of at least 5.0 and of at most 10.0, for example of at least 5.0 and of 12. The pipe according to any one of statements 1 to 11, wherein the metallocene-catalyzed polyethylene resin has a molecular weight distribution Mw/Mn of at least 6.0; preferably of at least 6.0 and at most 40.0, preferably of at least 6.0 and of at most 30.0, preferably of at least 6.0 and of at most 25.0, preferably of at least 6.0 and of at most 20.0, preferably of at least 6.0 and of at most 15.0, preferably of at least 6.0 and of at most 14.0, preferably of at least 6.0 and of at most 12.0, for example of at least 6.0 and of at most 10.0, for example of at least 6.0 and of at most 9.0, Mw being the weight-average molecular weight and Mn being the number-average molecular weight.

13. The pipe according to any one of statements 1 to 12, wherein the metallocene-catalyzed polyethylene resin has a molecular weight distribution Mw/Mn of at least 6.5; preferably of at least 6.5 and at most 40.0, preferably of at least 6.5 and of at most 30.0, preferably of at least 6.5 and of at most 25.0, preferably of at least 6.5 and of at most 20.0, preferably of at least 6.5 and at most 15.0, preferably of at least 6.5 and of at most 14.0, preferably of at least 6.5 and of at most 12.0, for example of at least 6.5 and of at most 10.0, for example of at least 6.5 and of at most 9.0, Mw being the weight-average molecular weight and Mn being the number-average molecular weight.

14. The pipe according to any one of statements 1 to 13, wherein the metallocene-catalyzed polyethylene resin has stress crack resistance of at least 320 hours, preferably of at least 500 hours, preferably at least 1000 hours, preferably at least 1500 hours, as determined using the Full Notched Creep Test (FNCT) according to ISO 16770 at 90° C. under a 4.0 MPa constraint in 2% NM-5; or wherein the polyethylene resin has stress crack resistance of at least 6400 hours, preferably at least 8760 hours, preferably at least 10000 hours, as determined using the Full Notched Creep Test (FNCT) according to ISO 16770 performed at 80° C. under a 4.0 MPa constraint in 2% Arkopal N100; or wherein the polyethylene resin has stress crack resistance of at least 1700 hours, preferably at least 2700 hours, as determined using the Full Notched Creep Test (FNCT) according to ISO 16770 performed at 80° C. under a 4.0 MPa constraint in a solution of 0.5 wt % Maranil in water.

15. The pipe according to any one of statements 1 to 14, wherein the metallocene-catalyzed polyethylene resin further comprises at least one processing aid.

16. The pipe according to any one of statements 1 to 15, wherein the metallocene-catalyzed polyethylene resin further comprises at least 100 ppm of at least one processing aid, preferably a silicon- or fluorine-based processing aid, for example a fluoroelastomer; preferably fluoro elastomers and crystalline or semi-crystalline fluoroplastics or blends thereof.

17. The pipe according to any one of statements 1 to 16, wherein the metallocene-catalyzed polyethylene resin has a rheology long chain branching index $g_{rheo}$ of at most 0.9, preferably of at most 0.80, preferably of at most 0.70, for example of at most 0.65, measured according to the formula, as described in WO 2008/113680: $g_{rheo}(PE)=M_w(SEC)/M_w(\eta_0, MWD, SCB)$ wherein Mw (SEC) is the weight average molecular weight obtained from size exclusion chromatography expressed in kDa;

and wherein Mw ($\eta_0$, MWD, SCB) is determined according to the following, also expressed in kDa: $M_w(\eta_0, MWD, SCB)=\exp(1.7789+0.199769 \ln M_n+0.209026 (\ln \eta_0)+0.955 (\ln \rho)-0.007561 (\ln M_z)(\ln \eta_0)+0.02355 (\ln M_z)^2)$ wherein the zero shear viscosity $\eta 0$ in Pa*s is obtained from a frequency sweep experiment combined with a creep experiment, in order to extend the frequency range to values down to 10-4 s−1 or lower, and taking the usual assumption of equivalence of angular frequency (rad/s) and shear rate; wherein zero shear viscosity $\eta 0$ is estimated by fitting with Carreau-Yasuda flow curve ($\eta$-W) at a temperature of 190° C., obtained by oscillatory shear rheology on ARES-G2 equipment (manufactured by TA Instruments) in the linear viscoelasticity domain; wherein circular frequency (W in rad/s) varies from 0.05-0.1 rad/s to 250-500 rad/s, typically 0.1 to 250 rad/s, and the shear strain is typically 10%. In practice, the creep experiment is carried out at a temperature of 190° C. under nitrogen atmosphere with a stress level such that after 1200 s the total strain is less than 20%; wherein the apparatus used is an AR-G2 manufactured by TA instruments; preferably, the metallocene-catalyzed polyethylene resin has a rheology long chain branching index $g_{rheo}$ a of at most 0.90, for example at most 0.80, for example at most 0.70, for example at most 0.65, for example at least 0.40.

18. The pipe according to any one of statements 1 to 17, wherein the metallocene-catalyzed polyethylene resin comprises at least 30.0% by weight and at most 50.0% by weight of polyethylene fraction A, for example at least 40.0% by weight and at most 49.9% by weight of polyethylene fraction A, for example at least 43.0% by weight and at most 49.9% by weight of polyethylene fraction A, for example at least 45.0% by weight and at most 49.9% by weight of polyethylene fraction A, for example at least 45.0% by weight and at most 49.0% by weight of polyethylene fraction A, for example at least 46.0% by weight and at most 49.8% by weight of polyethylene fraction A, for example at least 47.0% by weight and at most 49.5% by weight of polyethylene fraction A, for example at least 48.0% by weight and at most 49.0% by weight of polyethylene fraction A, based on the total weight of the polyethylene resin.

19. The pipe according to any one of statements 1 to 18, wherein the metallocene-catalyzed polyethylene resin comprises at least 50% by weight and at most 70% by weight of polyethylene fraction B, for example at least 50.5% by weight and at most 60.0% by weight of polyethylene fraction B, for example at least 50.5% by weight and at most 57.0% by weight of polyethylene fraction B, for example at least 50.5% by weight and at most 55.0% by weight of polyethylene fraction B, for example at least 50.5% by weight and at most 54.0% by weight of polyethylene fraction B, for example at least 50.5% by weight and at most 53.0% by weight of polyethylene fraction B, for example at least 51.0% by weight and at most 52.0%, by weight of polyethylene fraction B, based on the total weight of the metallocene-catalyzed polyethylene resin.

20. The pipe according to any one of statements 1 to 19, wherein the metallocene-catalyzed polyethylene resin comprises:
at least 40% by weight and at most 50% by weight of polyethylene fraction A, based on the total weight of the metallocene-catalyzed polyethylene resin; and at least 50% by weight and at most 60% by weight of metallocene-catalyzed polyethylene fraction B.

21. The pipe according to any one of statements 1 to 20, wherein the metallocene-catalyzed polyethylene resin comprises:
   at least 43.0% by weight and at most 49.8% by weight of polyethylene fraction A, based on the total weight of the polyethylene resin; and
   at least 50.2% by weight and at most 57.0% by weight of polyethylene fraction B based on the total weight of the polyethylene resin.

22. The pipe according to any one of statements 1 to 21, wherein the metallocene-catalyzed polyethylene resin comprises:
   at least 48.0% by weight and at most 49.5% by weight of polyethylene fraction A, based on the total weight of the polyethylene resin; and
   at least 50.5% by weight and at most 52.0% by weight of polyethylene fraction B based on the total weight of the polyethylene resin.

23. The pipe according to any one of statements 1 to 22, wherein the metallocene-catalyzed polyethylene resin comprises:
   at least 48.0% by weight and at most 49.0% by weight of polyethylene fraction A, based on the total weight of the polyethylene resin; and
   at least 51.0.% by weight and at most 52.0% by weight of polyethylene fraction B based on the total weight of the polyethylene resin.

24. The pipe according to any one of statements 1 to 23, wherein fraction A is a polyethylene homopolymer, or can have a very low comonomer content.

25. The pipe according to any one of statements 1 to 24, wherein the metallocene is selected from one of the following formula (IVa) or (IVb):

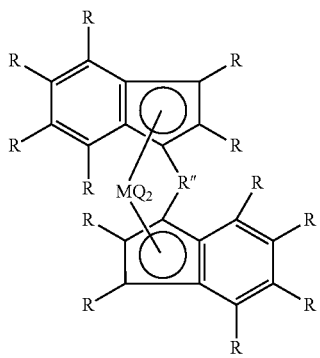

(IVa)

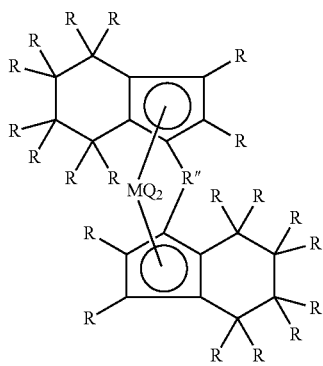

(IVb)

wherein each R in formula (IVa) or (IVb) is the same or different and is selected independently from hydrogen or $XR'_v$, in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R" is a structural bridge between the two indenyl or tetrahydrogenated indenyls that comprises a $C_1$-$C_4$ alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal from Group 4 of the Periodic Table or vanadium.

26. The pipe according to any one of statements 1 to 25, wherein the metallocene is selected from the group comprising bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis(indenyl) zirconium dichloride, and bis(n-butyl-cyclopentadienyl) zirconium dichloride; ethylenebis(4,5,6,7-tetrahydro-1-indenyl) zirconium dichloride, ethylenebis (1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride. Most preferably the metallocene is ethylenebis(tetrahydroindenyl)zirconium dichloride or ethylenebis(tetrahydroindenyl) zirconium difluoride.

27. The pipe according to any one of statements 1 to 26, wherein the metallocene-catalyzed polyethylene resin is prepared in slurry, gas, or solution phase.

28. The pipe according to any one of statements 1 to 27, wherein the metallocene-catalyzed polyethylene resin is prepared in two or more serially connected reactors, comprising at least one first and at least one second reactors, preferably loop reactors, more preferably slurry loop reactors, most preferably liquid full loop reactors.

29. The pipe according to any one of statements 1 to 28, wherein each fraction is prepared in different reactors of at least two loop reactors connected in series, preferably wherein the polyethylene resin is obtained by operating the at least two reactors under different polymerization conditions.

30. The pipe according to any one of statements 1 to 29, wherein the metallocene-catalyzed polyethylene resin having a multimodal molecular weight distribution is prepared using a process comprising the steps of:
   (a) feeding ethylene monomer, a diluent, at least one metallocene catalyst, optionally hydrogen, and optionally one or more olefin co-monomers, optionally one or more anti-fouling agents, optionally an alkyl aluminium component, into at least one first slurry loop reactor; polymerizing the ethylene monomer, and the optionally one or more olefin co-monomers, in the presence of the metallocene catalyst, and optional hydrogen, in said first slurry loop reactor to produce a first polyethylene fraction; (b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, optionally one or more anti-fouling agents, thereby producing the metallocene-catalyzed polyethylene resin.
31. The pipe according to any one of statements 1 to 30, wherein the anti-fouling agent is selected from the group comprising ethyleneoxide-propyleneoxide-ethyleneoxide block copolymer; N,N-bis-(2-hydroxyethyl)-($C_{10}$-$C_{20}$) alkylamine); bis(2-hydroxyethyl)cocoamine); (N,N-bis (2-hydroxy-ethyl)alkylamine); antifouling comprising >50% of dicocoalkyl-dimethyl ammonium chloride, about 35% 1-hexene, <2% isopropanol, and <1% hexane; N,N-Bis(2hydroxy-ethyl) alkylamine; dodecylbenzenesulfonic acid; antifouling comprising about 40-50% toluene, about 0-5% propan-2-ol, about 5-15% DINNSA (dinonyinaphthasulphonic acid), about 15-30% solvent naptha, about 1-10% trade secret polymer containing N, and about 10-20% polymer containing S; antifouling comprising about 10-20% alkenes (polymer with sulfur dioxide), about 3-8% benzenesulfonic acid (4-C10-13-sec-alkyl derivatives); antifouling comprising about 14 wt % of polybutene sulfate, about 3 wt % of aminoethanolepichlorohydrin polymer, about 13 wt % of alkylbenzenesulfonic acid, about 70 wt % of toluene and trace amounts of quaternary ammonium salt of aliphatic alkyl and propyl alcohol.
32. The pipe according to any one of statements 1 to 31, wherein the metallocene-catalyzed polyethylene resin has a bimodal molecular weight distribution and comprises two polyethylene fractions A and B, fraction A having a lower molecular weight and a higher density than fraction B, with each fraction being prepared in different reactors of two slurry loop reactors connected in series.
33. The pipe according to any one of statements 1 to 32, wherein the co-monomer is selected from the group comprising aliphatic $C_3$-$C_{20}$ alpha-olefins, preferably from the group comprising propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene, preferably 1-hexene.
34. The pipe according to any one of statements 1 to 33, wherein the co-monomer is 1-hexene.
35. The pipe according to any one of statements 1 to 34, wherein the metallocene-catalyzed polyethylene resin having a bimodal molecular weight distribution is prepared using a process comprising the steps of:
    (a) feeding ethylene monomer, a diluent, at least one metallocene catalyst, hydrogen, optionally one or more olefin co-monomers, optionally one or more anti-fouling agents, optionally an alkyl aluminium component, into a first slurry loop reactor; polymerizing the ethylene monomer, in the presence of the metallocene catalyst, and hydrogen, in said first slurry loop reactor to produce a first polyethylene fraction A;
    (b) feeding the first polyethylene fraction A to a second slurry loop reactor serially connected to the first slurry loop reactor, and in the second slurry loop reactor polymerizing ethylene, and optionally one or more olefin co-monomers, in the presence of the first polyethylene fraction A, and optionally hydrogen, thereby producing the metallocene-catalyzed polyethylene resin.
36. The pipe according to any one of statements 1 to 35, wherein the polyethylene resin having a bimodal molecular weight distribution is prepared using a process comprising the steps of:
    (a) feeding ethylene monomer, a diluent, at least one metallocene catalyst, hydrogen, optionally one or more olefin co-monomers, optionally one or more anti-fouling agents, optionally an alkyl aluminium component, into a first slurry loop reactor; polymerizing the ethylene monomer, in the presence of the metallocene catalyst, and hydrogen, in said first slurry loop reactor to produce a first polyethylene fraction A;
    (b) feeding the first polyethylene fraction A to a second slurry loop reactor serially connected to the first slurry loop reactor, and in the second slurry loop reactor polymerizing ethylene, and one or more olefin co-monomers, in the presence of the first polyethylene fraction, and optionally hydrogen, thereby producing the metallocene-catalyzed polyethylene resin.
37. The pipe according to any one of statements 1 to 36, wherein the metallocene-catalyzed polyethylene resin has a density of at least 0.9420 $g/cm^3$ and at most 0.9460 $g/cm^3$, for example of at least 0.9425 $g/cm^3$ and at most 0.9455 $g/cm^3$, for example at least 0.9430 $g/cm^3$ and at most 0.9455 $g/cm^3$, for example at least 0.9430 $g/cm^3$ and at most 0.9450 $g/cm^3$, for example at least 0.9430 $g/cm^3$ and at most 0.9445 $g/cm^3$, for example at least 0.9430 $g/cm^3$ and at most 0.9440 $g/cm^3$, preferably wherein the metallocene-catalyzed polyethylene resin has a density of at least 0.9420 $g/cm^3$ and at most 0.9455 $g/cm^3$.
38. The pipe according to any one of statements 1 to 37, wherein fraction A has a density as measured on the fluff of said fraction A of at least 0.955 $g/cm^3$, for example at least 0.9550 $g/cm^3$, preferably of at least 0.958 $g/cm^3$, for example at least 0.9580 $g/cm^3$, for example of at least 0.960 $g/cm^3$, for example at least 0.9600 $g/cm^3$, for example of at least 0.963 $g/cm^3$, for example at least 0.9630 $g/cm^3$, as measured according to ASTM D-1505 at a temperature of 23° C. or as calculated from the measured $MI_2$.
39. The pipe according to any one of statements 1 to 38, wherein fraction B has a density of at least 0.9080 $g/cm^3$ and at most 0.9300 $g/cm^3$, preferably of at least 0.9085 $g/cm^3$ and at most 0.9290 $g/cm^3$, for example of at least 0.9090 $g/cm^3$ and at most 0.9280 $g/cm^3$, for example of at least 0.9095 $g/cm^3$ and at most 0.9270 $g/cm^3$, for example of at least 0.9100 $g/cm^3$ and at most 0.9260 $g/cm^3$, for example of at least 0.9105 $g/cm^3$ and at most 0.9250 $g/cm^3$, for example of at least 0.9110 $g/cm^3$ and at most 0.9240 $g/cm^3$, for example of at least 0.9115 $g/cm^3$ and at most 0.9230 $g/cm^3$, for example of at least 0.9120 $g/cm^3$ and at most 0.9220 $g/cm^3$, for example of at least 0.9125 $g/cm^3$ and at most 0.9210 $g/cm^3$, for example of at least 0.9130 $g/cm^3$ and at most 0.9200 $g/cm^3$.
40. The pipe according to any one of statements 1 to 39, wherein the polyethylene resin has a density of at least 0.9420 $g/cm^3$ and at most 0.9460 $g/cm^3$, preferably of at least 0.9425 $g/cm^3$ and at most 0.9455 $g/cm^3$, preferably at least 0.9430 $g/cm^3$ and at most 0.9455 $g/cm^3$, for example at least 0.9430 $g/cm^3$ and at most 0.9450 $g/cm^3$, preferably at least 0.9430 $g/cm^3$ and at most 0.9445 $g/cm^3$, preferably at least 0.9430 $g/cm^3$ and at most 0.9440 $g/cm^3$, preferably wherein the polyethylene resin has a density of at least 0.9420 $g/cm^3$ and at most 0.9455 $g/cm^3$ and wherein fraction A has a density as measured on the fluff of fraction A of at least 0.955 $g/cm^3$, for example at least 0.9550 $g/cm^3$, preferably of at least 0.958 $g/cm^3$, for example at least 0.9580 $g/cm^3$, for example of at least 0.960 $g/cm^3$, for example at least 0.9600 $g/cm^3$, for example of at least 0.963 $g/cm^3$, for example at least 0.9630 $g/cm^3$, as measured according to ASTM D-1505 at a temperature of 23° C.

41. The pipe according to any one of statements 1 to 40, wherein the polyethylene resin has a density of at least 0.9420 g/cm$^3$ and at most 0.9460 g/cm$^3$, preferably of at least 0.9425 g/cm$^3$ and at most 0.9455 g/cm$^3$, preferably at least 0.9430 g/cm$^3$ and at most 0.9455 g/cm$^3$, for example at least 0.9430 g/cm$^3$ and at most 0.9450 g/cm$^3$, preferably at least 0.9430 g/cm$^3$ and at most 0.9445 g/cm$^3$, preferably at least 0.9430 g/cm$^3$ and at most 0.9440 g/cm$^3$, preferably wherein the polyethylene resin has a density of at least 0.9420 g/cm$^3$ and at most 0.9455 g/cm$^3$ and wherein fraction B has a density of at least 0.9080 g/cm$^3$ and at most 0.9300 g/cm$^3$, preferably of at least 0.9085 g/cm$^3$ and at most 0.9290 g/cm$^3$, for example of at least 0.9090 g/cm$^3$ and at most 0.9280 g/cm$^3$, for example of at least 0.9095 g/cm$^3$ and at most 0.9270 g/cm$^3$, for example of at least 0.9100 g/cm$^3$ and at most 0.9260 g/cm$^3$, for example of at least 0.9105 g/cm$^3$ and at most 0.9250 g/cm$^3$, for example of at least 0.9110 g/cm$^3$ and at most 0.9240 g/cm$^3$, for example of at least 0.9115 g/cm$^3$ and at most 0.9230 g/cm$^3$, for example of at least 0.9120 g/cm$^3$ and at most 0.9220 g/cm$^3$, for example of at least 0.9125 g/cm$^3$ and at most 0.9210 g/cm$^3$, for example of at least 0.9130 g/cm$^3$ and at most 0.9200 g/cm$^3$.

42. The pipe according to any one of statements 1 to 41, wherein the polyethylene resin has a density of at least 0.9420 g/cm$^3$ and at most 0.9460 g/cm$^3$, for example of at least 0.9425 g/cm$^3$ and at most 0.9455 g/cm$^3$, for example at least 0.9430 g/cm$^3$ and at most 0.9455 g/cm$^3$, for example at least 0.9430 g/cm$^3$ and at most 0.9450 g/cm$^3$, for example at least 0.9430 g/cm$^3$ and at most 0.9445 g/cm$^3$, for example at least 0.9430 g/cm$^3$ and at most 0.9440 g/cm$^3$, preferably wherein the polyethylene resin has a density of at least 0.9420 g/cm$^3$ and at most 0.9455 g/cm$^3$ and wherein fraction A has a density of at least 0.955 g/cm$^3$, for example at least 0.9550 g/cm$^3$, preferably of at least 0.958 g/cm$^3$, for example at least 0.9580 g/cm$^3$, for example of at least 0.960 g/cm$^3$, for example at least 0.9600 g/cm$^3$, for example of at least 0.963 g/cm$^3$, for example at least 0.9630 g/cm$^3$, and wherein fraction B has a density of at least 0.9080 g/cm$^3$ and at most 0.9300 g/cm$^3$, for example of at least 0.9085 g/cm$^3$ and at most 0.9290 g/cm$^3$, for example of at least 0.9090 g/cm$^3$ and at most 0.9280 g/cm$^3$, for example of at least 0.9095 g/cm$^3$ and at most 0.9270 g/cm$^3$, for example of at least 0.9100 g/cm$^3$ and at most 0.9260 g/cm$^3$, for example of at least 0.9105 g/cm$^3$ and at most 0.9250 g/cm$^3$, for example of at least 0.9110 g/cm$^3$ and at most 0.9240 g/cm$^3$, for example of at least 0.9115 g/cm$^3$ and at most 0.9230 g/cm$^3$, for example of at least 0.9120 g/cm$^3$ and at most 0.9220 g/cm$^3$, for example of at least 0.9125 g/cm$^3$ and at most 0.9210 g/cm$^3$, for example of at least 0.9130 g/cm$^3$ and at most 0.9200 g/cm$^3$.

43. The pipe according to any one of statements 1 to 42, wherein the metallocene-catalyzed polyethylene resin has a melt index MI$_5$ of at least 0.10 g/10 min and of at most 1.0 g/10 min, preferably at least 0.15 g/10 min and at most 0.80 g/10 min, preferably at least 0.15 g/10 min and at most 0.60 g/10 min.

44. The pipe according to any one of statements 1 to 43, wherein fraction B has a melt index HLMI of at most 2.0 g/10 min, preferably wherein fraction B has a HLMI of at most 1.5 g/10 min, preferably at most 1.0 g/10 min, preferably of at most 0.5 g/10 min, for example at most 0.4 g/10 min, for example wherein fraction B has a HLMI of at most 0.1 g/10 min, for example at least 0.02 g/10 min, for example at least 0.04 g/10 min.

45. The pipe according to any one of statements 1 to 44, wherein the polyethylene resin has a molecular weight distribution Mw/Mn of at most 40.0, preferably of at most 35.0, preferably of at most 30.0, preferably of at most 25.0, preferably of at most 20.0, preferably of at most 15.0, preferably of at most 14.0, preferably of at most 12.0, preferably of at most 11.0, preferably of at most 10.0, preferably at most 9.0. Preferably the polyethylene resin has a molecular weight distribution Mw/Mn of at least 4.0, preferably of at least 5.0, preferably of at least 6.0, preferably of at least 6.5, preferably of at least 7.0. Preferably, the polyethylene resin has a molecular weight distribution Mw/Mn, preferably of at least 4.0 and at most 14.0, preferably of at least 5.0 and at most 12.0, preferably of at least 6.0 and at most 11.0, preferably of at least 6.5 and at most 10.0, preferably of at least 6.5 and at most 9.0.

46. The pipe according to any one of statements 1 to 45, wherein the polyethylene resin has a viscosity of at least 300 000 Pa*s, preferably of at least 350 000 Pa*s, as measured using Rheological Dynamic Analysis at 190° C. at a frequency of 10$^{-2}$ rad/s.

47. The pipe according to any one of statements 1 to 46, wherein the polyethylene resin comprises at least 50 ppm of at least one processing aid, preferably at least 100 ppm, preferably at least 200 ppm, of at least one processing aid, preferably a silicon- or fluorine-based processing aid, for example a fluoroelastomer.

48. The pipe according to any one of statements 1 to 47, wherein the pipe has hydrostatic pressure test resistance at 10 bar and 20° C. of at least 50 years, wherein the time is extrapolated performed based on a "log imposed constraint–log failure time" extrapolation as recommended in ISO 9080 norm; and wherein the hydrostatic pressure test resistance is measured on 32 mm SDR 11 pipes, wherein SDR is the ratio of external diameter to thickness.

49. The pipe according to any one of statements 1 to 48, wherein fraction A has an MI$_2$ of at least 60 g/10 min and of at most 250 g/10 min, wherein the polyethylene resin has a density of at least 0.9420 g/cm$^3$ and at most 0.9460 g/cm$^3$, for example of at least 0.9425 g/cm$^3$ and at most 0.9455 g/cm$^3$, for example at least 0.9430 g/cm$^3$ and at most 0.9455 g/cm$^3$, for example at least 0.9430 g/cm$^3$ and at most 0.9450 g/cm$^3$, for example at least 0.9430 g/cm$^3$ and at most 0.9445 g/cm$^3$, for example at least 0.9430 g/cm$^3$ and at most 0.9440 g/cm$^3$, preferably wherein the polyethylene resin has a density of at least 0.9420 g/cm$^3$ and at most 0.9455 g/cm$^3$.

50. The pipe according to any one of statements 1 to 49, wherein the polyethylene resin has a molecular weight distribution Mw/Mn of at least 5.0, Mw being the weight-average molecular weight and Mn being the number-average molecular weight, wherein the polyethylene resin has a density of at least 0.9420 g/cm$^3$ and at most 0.9460 g/cm$^3$, for example of at least 0.9425 g/cm$^3$ and at most 0.9455 g/cm$^3$, for example at least 0.9430 g/cm$^3$ and at most 0.9455 g/cm$^3$, for example at least 0.9430 g/cm$^3$ and at most 0.9450 g/cm$^3$, for example at least 0.9430 g/cm$^3$ and at most 0.9445 g/cm$^3$, for example at least 0.9430 g/cm$^3$ and at most 0.9440 g/cm$^3$, preferably wherein the polyethylene resin has a density of at least 0.9420 g/cm$^3$ and at most 0.9455 g/cm$^3$.

51. The pipe according to any one of statements 1 to 50, wherein fraction A has an MI$_2$ of at least 60 g/10 min and of at most 250 g/10 min, wherein fraction A has a density as measured on the fluff of at least 0.955 g/cm$^3$, for example at least 0.9550 g/cm$^3$, preferably of at least 0.958 g/cm$^3$, for example at least 0.9580 g/cm$^3$, for example of at least 0.960 g/cm³, for example at least 0.9600 g/cm³, for example of at least 0.963 g/cm³, for example at least 0.9630 g/cm³, as measured according to ASTM D-1505 at a temperature of 23° C.

52. The pipe according to any one of statements 1 to 51, wherein the polyethylene resin has a molecular weight distribution Mw/Mn of at least 6.5, Mw being the weight-average molecular weight and Mn being the number-average molecular weight, wherein fraction A has a density as measured on the fluff of at least 0.955 g/cm³, for example at least 0.9550 g/cm³, preferably of at least 0.958 g/cm³, for example at least 0.9580 g/cm³, for example of at least 0.960 g/cm³, for example at least 0.9600 g/cm³, for example of at least 0.963 g/cm³, for example at least 0.9630 g/cm³, as measured according to ASTM D-1505 at a temperature of 23° C.

53. The pipe according to any one of statements 1 to 52, wherein the pipe has an extrapolated time-to-failure at 20° C. at 10 MPa according to ASTM F2023 and ASTM F2769-10, performed on a 32 mm SDR 11 pipe of at least 50 years, preferably of at least 60 years, preferably of at least 100 years, preferably of at least 125 years.

54. The pipe according to any one of statements 1 to 53, wherein the pipe has a time to failure according to ISO 1167, performed on a 32 mm SDR 11 pipe at 80° C. under a hoop stress of 5.5 MPa, of at least 1000 hours, and preferably at least 5000 hours.

55. A metallocene-catalyzed polyethylene resin, wherein the polyethylene resin has a multimodal molecular weight distribution and comprises at least two polyethylene fractions A and B, wherein fractions A and B are prepared in different reactors of at least two reactors connected in series, wherein the polyethylene resin comprises:
at least 30% by weight and at most 50% by weight of the polyethylene fraction A, based on the total weight of the polyethylene resin, wherein fraction A has a melt index $MI_2$ of at least 50 g/10 min as determined on the fluff of fraction A according to ISO 1133:1997 condition D at a temperature of 190° C. and under a load of 2.16 kg;
wherein the polyethylene resin has a melt index $MI_5$ of at least 0.10 g/10 min and of at most 1.0 g/10 min as determined according to ISO 1133:1997, condition T, at 190° C. and under a load of 5 kg; and a density of at least 0.9420 g/cm³ and of at most 0.9460 g/cm³ as determined according to the procedure of ASTM D-1505 at a temperature of 23° C., preferably wherein the polyethylene resin has a density of at least 0.9420 g/cm³ and at most 0.9455 g/cm³, and preferably wherein fraction B has a density of at most 0.9210 g/cm³, for example of at most 0.9200 g/cm³.

56. The metallocene-catalyzed polyethylene resin according to statement 55, or the resin as recited (defined) in any of statements 1 to 54; wherein the polyethylene resin has an HLMI of at least 4.0 g/10 min and at most 14.0 g/10 min, preferably of at least 7.0 g/10 min and at most 13.0 g/10 min, as measured according to the procedure of ISO 1133:1997 condition G with a temperature of 190° C. and a load of 21.6 kg.

57. The metallocene-catalyzed polyethylene resin according to statement 55 or 56, or the resin as defined in any of statements 1 to 54, or the pipe according to any one of statements 1 to 53; wherein fraction B has a density of at most 0.9210 g/cm³.

58. The metallocene-catalyzed polyethylene resin according to statement 55 or 56, or the resin as recited (defined) in any of statements 1 to 54; or the pipe according to any one of statements 1 to 53; wherein fraction B has a density of at most 0.9200 g/cm³.

59. The metallocene-catalyzed polyethylene resin according to any one of statements 55 to 58, or the resin as recited in any of statements 1 to 54; or the pipe according to any one of statements 1 to 54, wherein the metallocene-catalyzed polyethylene resin comprises at least 30.0% and at most 50.0% by weight of polyethylene fraction A, for example at least 32.0% and at most 49.9% by weight of polyethylene fraction A, for example at least 34.0% and at most 49.8% by weight of polyethylene fraction A, for example at least 36.0% and at most 49.7% by weight of polyethylene fraction A, for example at least 37.0% and at most 49.6% by weight of polyethylene fraction A, for example at least 38.0% and at most 49.5% by weight of polyethylene fraction A, for example at least 39.0% and at most 49.4% by weight of polyethylene fraction A, for example at least 40.0% and at most 49.3% by weight of polyethylene fraction A, for example at least 41.0% and at most 49.2% by weight of polyethylene fraction A, for example at least 42.0% and at most 49.1% by weight of polyethylene fraction A, for example at least 43.0% and at most 49.0% by weight of polyethylene fraction A, based on the total weight of the polyethylene resin.

60. The metallocene-catalyzed polyethylene resin according to any one of statements 55 to 59, or the resin as recited (defined) in any of statements 1 to 54; or the pipe according to any one of statements 1 to 54 or 59, wherein the metallocene-catalyzed polyethylene resin comprises at least 50.0% and at most 70.0% by weight of polyethylene fraction B, for example at least 50.1% and at most 68.0% by weight of polyethylene fraction B, for example at least 50.2% and at most 66.0% by weight of polyethylene fraction B, for example at least 50.3% and at most 64.0% by weight of polyethylene fraction B, for example at least 50.4% and at most 63.0% by weight of polyethylene fraction B, for example at least 50.5% and at most 62.0% by weight of polyethylene fraction B, for example at least 50.6% and at most 61.0% by weight of polyethylene fraction B, for example at least 50.7% and at most 60.0% by weight of polyethylene fraction B based, for example at least 50.8% and at most 59.0% by weight of polyethylene fraction B, for example at least 50.9% and at most 58.0% by weight of polyethylene fraction B, for example at least 51.0% and at most 57.0% by weight of polyethylene fraction B, based on the total weight of the metallocene-catalyzed polyethylene resin.

61. The metallocene-catalyzed polyethylene resin according to any one of statements 55 to 60, or the resin as recited (defined) in any of statements 1 to 54; or the pipe according to any one of statements 1 to 54, 59, or 60, wherein the cold temperature Charpy impact strength, as measured according to ISO 179 at −25° C. in kJ/m², is at least 10 kJ/m², preferably at least 11 kJ/m², preferably at least 12 kJ/m², preferably at least 13 kJ/m², for example at least 14 kJ/m², for example at least 15 kJ/m².

Preferably, the present invention relates to a pipe comprising at least one metallocene-catalyzed polyethylene resin having a multimodal molecular weight distribution and comprising at least two polyethylene fractions A and B, wherein fractions A and B are prepared in different reactors of at least two reactors connected in series, wherein the polyethylene resin comprises: at least 30% by weight and at most 50% by weight of the polyethylene fraction A, based on the total weight of the polyethylene resin, wherein fraction A has a melt index $MI_2$ of at least 50 g/10 min as determined on the fluff of fraction A according to ISO 1133:1997 condition Data temperature of 190° C. and under a load of 2.16 kg; wherein the polyethylene resin has a melt index $MI_5$ of at least 0.10 g/10 min and of at most 1.0 g/10 min as determined according to ISO 1133:1997, condition T, at 190° C. and under a load of 5 kg; wherein the polyethylene resin has a density of at least 0.9420 g/cm$^3$ and of at most 0.9460 g/cm$^3$, preferably wherein the polyethylene resin has a density of at least 0.9420 g/cm$^3$ and at most 0.9455 g/cm$^3$, as determined according to the procedure of ASTM D-1505 at a temperature of 23°; and preferably wherein at least one of said fractions is a polyethylene copolymer, which is a copolymer of ethylene and at least one C3-C12-alpha olefin, preferably 1-hexene.

The present invention also encompasses at least one metallocene-catalyzed polyethylene resin, having a multimodal molecular weight distribution and comprising at least two polyethylene fractions A and B, wherein fractions A and B are prepared in different reactors of at least two reactors connected in series, wherein the polyethylene resin comprises: at least 30% by weight and at most 50% by weight of the polyethylene fraction A, based on the total weight of the polyethylene resin, wherein fraction A has a melt index $MI_2$ of at least 50 g/10 min as determined on the fluff of fraction A according to ISO 1133:1997 condition D at a temperature of 190° C. and under a load of 2.16 kg; wherein the polyethylene resin has an HLMI of at least 4.0 g/10 min and at most 14.0 g/10 min, preferably of at least 7.0 g/10 min and at most 13.0 g/10 min, as measured according to the procedure of ISO 1133:1997 condition G with a temperature of 190° C. and a load of 21.6 kg; wherein the polyethylene resin has a density of at least 0.9420 g/cm$^3$ and of at most 0.9460 g/cm$^3$, preferably wherein the polyethylene resin has a density of at least 0.9420 g/cm$^3$ and at most 0.9455 g/cm$^3$, as determined according to the procedure of ASTM D-1505 at a temperature of 23° C.; and preferably, wherein at least one of said fractions is a polyethylene copolymer, which is a copolymer of ethylene and at least one C3-C12-alpha olefin, preferably 1-hexene.

The term "polyethylene resin" as used herein refers to polyethylene fluff or powder that is extruded, and/or melted and/or pelletized and can be produced through compounding and homogenizing of the polyethylene resin as taught herein, for instance, with mixing and/or extruder equipment. As used herein, the term "polyethylene" may be used as a short hand for "polyethylene resin".

The term "fluff" or "powder" as used herein refers to polyethylene material with the hard catalyst particle at the core of each grain and is defined as the polymer material after it exits the polymerization reactor (or the final polymerization reactor in the case of multiple reactors connected in series).

Under normal production conditions in a production plant it is expected that the melt index ($MI_2$, HLMI, $MI_5$) will be different for the fluff, than for the polyethylene resin. Under normal production conditions in a production plant it is expected that the density will be slightly different for the fluff, than for the polyethylene resin. Unless otherwise indicated, density and melt index for the metallocene-catalyzed polyethylene resin refer to the density and melt index as measured on the polyethylene resin as defined above. The density of the polyethylene resin refers to the polymer density as such, not including additives such as for example pigments, for example black carbon, unless otherwise stated.

The invention relates to a pipe comprising at least one metallocene-catalyzed polyethylene resin, wherein the polyethylene resin has a multimodal molecular weight distribution and comprises at least two polyethylene fractions A and B. The polyethylene resin typically has a multimodal molecular weight distribution. In an embodiment, the polyethylene resin has a bimodal molecular weight distribution. In an embodiment, said polyethylene fraction A has a monomodal molecular weight distribution. In an embodiment, said polyethylene fraction B has a monomodal molecular weight distribution. In some embodiments, said pipe can comprise two or more metallocene-catalyzed polyethylene resins, wherein each polyethylene resin has a multimodal molecular weight distribution and comprises at least two polyethylene fractions A and B.

As used herein, the term "monomodal polyethylene" or "polyethylene with a monomodal molecular weight distribution" refers to polyethylene having one maximum in their molecular weight distribution curve, which is also defined as a unimodal distribution curve. As used herein, the term "polyethylene with a bimodal molecular weight distribution" or "bimodal polyethylene" refers to polyethylene having a distribution curve being the sum of two unimodal molecular weight distribution curves, and refers to a polyethylene product having two distinct but possibly overlapping populations of polyethylene macromolecules each having different weight average molecular weights. As used herein, the term "polyethylene with a multimodal molecular weight distribution" or "multimodal polyethylene" refers to polyethylene with a distribution curve being the sum of at least two, preferably more than two unimodal distribution curves, and refers to a polyethylene product having two or more distinct but possibly overlapping populations of polyethylene macromolecules each having different weight average molecular weights. The multimodal polyethylene resin of the article can have an "apparent monomodal" molecular weight distribution, which is a molecular weight distribution curve with a single peak and no shoulder. In an embodiment, said polyethylene resin having a multimodal, preferably bimodal, molecular weight distribution can be obtained by physically blending said at least two polyethylene fractions A and B. In a preferred embodiment, said polyethylene resin having a multimodal, preferably bimodal, molecular weight distribution can be obtained by chemical blending of said at least two polyethylene fractions A and B, for example by using at least 2 reactors connected in series.

The at least one metallocene-catalyzed polyethylene resin comprises at least 30% by weight and at most 50% by weight of polyethylene fraction A, based on the total weight of the polyethylene resin. In some embodiments, the polyethylene resin comprises at least 30.0% by weight and at most 50.0% by weight of polyethylene fraction A, for example at least 40.0% by weight and at most 50.0% by weight of polyethylene fraction A, for example at least 43.0% by weight and at most 50.0% by weight of polyethylene fraction A, for example at least 45.0% by weight and at most 50.0% by weight of polyethylene fraction A, for example at least 46.0% by weight and at most 50.0% by weight of polyethylene fraction A, for example at least 47.0% by weight and at most 49.5% by weight of polyethylene fraction A, for example at least 48.0% by weight and at most 49.0% by weight of polyethylene fraction A, based on the total weight of the polyethylene resin. In some embodiments, the polyethylene resin comprises at least 50% by weight and at most 70% by weight of polyethylene fraction B, for example at least 50.0% by weight and at most 60.0% by weight of polyethylene fraction B, for example at least 50.0% by weight and at most 57.0% by weight of polyethylene fraction B, for example at least 50.0% by weight and at most 55.0% by weight of polyethylene fraction B, for example at least 50.0% by weight and at most 54.0% by weight of polyethylene fraction B, for example at least 50.5% by weight and at most 53.0% by weight of polyethylene fraction B, for example at least 51.0% by weight and at most 52.0% by weight of polyethylene fraction B, based on the total weight of the polyethylene resin.

In some preferred embodiments, the polyethylene resin comprises: at least 40% by weight and at most 50% by weight of polyethylene fraction A, based on the total weight of the polyethylene resin; and at least 50% by weight and at most 60% by weight of polyethylene fraction B.

In some preferred embodiments, the polyethylene resin comprises: at least 43.0% by weight and at most 50.0% by weight of polyethylene fraction A, based on the total weight of the polyethylene resin; and at least 50.0% by weight and at most 57.0% by weight of polyethylene fraction B.

In some preferred embodiments, the polyethylene resin comprises: at least 48.0% by weight and at most 50.0% by weight of polyethylene fraction A, based on the total weight of the polyethylene resin; and at least 50.0% by weight and at most 52.0% by weight of polyethylene fraction B.

In some preferred embodiments, the polyethylene resin comprises: at least 48.0% by weight and at most 49.5% by weight of polyethylene fraction A, based on the total weight of the polyethylene resin; and at least 50.5% by weight and at most 52.0% by weight of polyethylene fraction B.

In some preferred embodiments, the polyethylene resin comprises: at least 48.0% by weight and at most 49.0% by weight of polyethylene fraction A, based on the total weight of the polyethylene resin; and at least 51.0% by weight and at most 52.0% by weight of polyethylene fraction B.

The metallocene-catalyzed polyethylene resin having a multimodal, preferably bimodal, molecular weight distribution can be produced by polymerizing ethylene and one or more optional co-monomers, optionally hydrogen, in the presence of a metallocene catalyst system.

As used herein, the term "catalyst" refers to a substance that causes a change in the rate of a polymerization reaction. In the present invention, it is especially applicable to catalysts suitable for the polymerization of ethylene to polyethylene. The present invention especially relates to polyethylene prepared in the presence of single site catalyst. Amongst these catalysts, metallocene catalysts are preferred. As used herein, the terms "metallocene-catalyzed polyethylene resin", and "metallocene-catalyzed polyethylene" are synonymous and used interchangeably and refers to a polyethylene prepared in the presence of a metallocene catalyst.

The term "metallocene catalyst" or "metallocene" for short is used herein to describe any transition metal complexes comprising metal atoms bonded to one or more ligands. The preferred metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. The structure and geometry of the metallocene can be varied to adapt to the specific need of the producer depending on the desired polymer. Metallocenes typically comprise a single metal site, which allows for more control of branching and molecular weight distribution of the polymer. Monomers are inserted between the metal and the growing chain of polymer.

In one embodiment, the metallocene catalyst is a compound of formula (I) or (II):

(Ar)$_2$MQ$_2$ (I); or

R"(Ar)$_2$MQ$_2$ (II)

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl (IND), tetrahydroindenyl (THI), and fluorenyl, wherein each of said groups may be optionally substituted with one or more substituents each independently selected from the group consisting of halogen, hydrosilyl, SiR'''$_3$ wherein R''' is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl, and P;

wherein M is a transition metal selected from the group consisting of titanium, zirconium, hafnium, and vanadium; and preferably is zirconium;

wherein each Q is independently selected from the group consisting of halogen, a hydrocarboxy having 1 to 20 carbon atoms, and a hydrocarbyl having 1 to 20 carbon atoms and wherein said hydrocarbyl optionally contains one or more atoms selected from the group comprising B, Si, S, O, F, Cl, and P; and wherein R" is a divalent group or moiety bridging the two Ar groups and selected from the group consisting of C$_1$-C$_{20}$ alkylene, germanium, silicon, siloxane, alkylphosphine, and an amine, and wherein said R" is optionally substituted with one or more substituents each independently selected from the group consisting of halogen, hydrosilyl, SiR$_3$ wherein R is a hydrocarbyl having 1 to 20 carbon atoms, and wherein said hydrocarbyl optionally contains one or more atoms selected from the group comprising B, Si, S, O, F, Cl, and P.

Preferably, the metallocene comprises a bridged bis-indenyl and/or a bridged bis-tetrahydrogenated indenyl component. In an embodiment, the metallocene can be selected from one of the following formula (IVa) or (IVb):

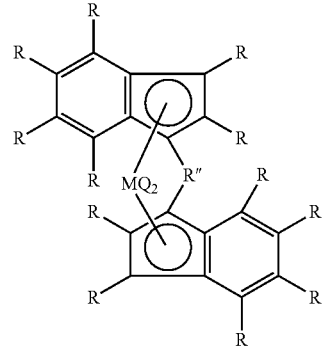
(IVa)

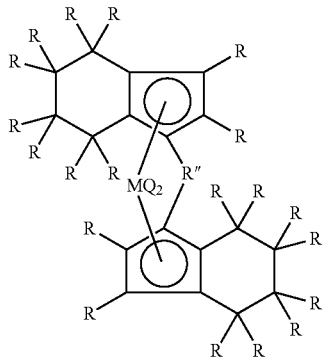

(IVb)

wherein each R in formula (IVa) or (IVb) is the same or different and is selected independently from hydrogen or $XR'_v$ in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R" is a structural bridge between the two indenyl or tetrahydrogenated indenyls that comprises a $C_1$-$C_4$ alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal from Group 4 of the Periodic Table or vanadium.

Each indenyl or tetrahydro indenyl component may be substituted with R in the same way or differently from one another at one or more positions of either of the fused rings. Each substituent is independently chosen. If the cyclopentadienyl ring is substituted, its substituent groups are preferably not so bulky so as to affect coordination of the olefin monomer to the metal M. Any substituents XR'v on the cyclopentadienyl ring are preferably methyl. More preferably, at least one and most preferably both cyclopentadienyl rings are unsubstituted. In a particularly preferred embodiment, the metallocene comprises a bridged unsubstituted bis-indenyl and/or bis-tetrahydrogenated indenyl i.e. all R are hydrogens. More preferably, the metallocene comprises a bridged unsubstituted bis-tetrahydrogenated indenyl.

Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis(indenyl) zirconium dichloride, and bis(n-butyl-cyclopentadienyl) zirconium dichloride; ethylenebis (4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride. Most preferably the metallocene is ethylene-bis (tetrahydroindenyl)zirconium dichloride or ethylene-bis (tetrahydroindenyl) zirconium difluoride.

As used herein, the term "hydrocarbyl having 1 to 20 carbon atoms" refers to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl.

As used herein, the term "hydrocarboxy having 1 to 20 carbon atoms" refers to a moiety with the formula hydrocarbyl-O—, wherein the hydrocarbyl has 1 to 20 carbon atoms as described herein. Preferred hydrocarboxy groups are selected from the group comprising alkyloxy, alkenyloxy, cycloalkyloxy or aralkoxy groups.

As used herein, the term "alkyl", by itself or as part of another substituent, refers to straight or branched saturated hydrocarbon group joined by single carbon-carbon bonds having 1 or more carbon atom, for example 1 to 12 carbon atoms, for example 1 to 6 carbon atoms, for example 1 to 4 carbon atoms. When a subscript is used herein following a carbon atom, the subscript refers to the number of carbon atoms that the named group may contain. Thus, for example, $C_{1-12}$alkyl means an alkyl of 1 to 12 carbon atoms. Examples of alkyl groups are methyl, ethyl, propyl, isopropyl, butyl, isobutyl, sec-butyl, tert-butyl, 2-methylbutyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers. Alkyl groups have the general formula $C_nH_{2n+1}$.

As used herein, the term "cycloalkyl", by itself or as part of another substituent, refers to a saturated or partially saturated cyclic alkyl radical. Cycloalkyl groups have the general formula $C_nH_{2n-1}$. When a subscript is used herein following a carbon atom, the subscript refers to the number of carbon atoms that the named group may contain. Thus, examples of $C_{3-6}$cycloalkyl include cyclopropyl, cyclobutyl, cyclopentyl, or cyclohexyl.

As used herein, the term "aryl", by itself or as part of another substituent, refers to a radical derived from an aromatic ring, such as phenyl, naphthyl, indanyl, or 1,2,3, 4-tetrahydro-naphthyl. When a subscript is used herein following a carbon atom, the subscript refers to the number of carbon atoms that the named group may contain.

As used herein, the term "alkylaryl", by itself or as part of another substituent, refers to refers to an aryl group as defined herein, wherein a hydrogen atom is replaced by an alkyl as defined herein. When a subscript is used herein following a carbon atom, the subscript refers to the number of carbon atoms that the named group or subgroup may contain.

As used herein, the term "arylalkyl", by itself or as part of another substituent, refers to refers to an alkyl group as defined herein, wherein a hydrogen atom is replaced by an aryl as defined herein. When a subscript is used herein following a carbon atom, the subscript refers to the number of carbon atoms that the named group may contain. Examples of $C_{6-10}$aryl$C_{1-6}$alkyl radicals include benzyl, phenethyl, dibenzylmethyl, methylphenylmethyl, 3-(2-naphthyl)-butyl, and the like.

As used herein, the term "alkylene", by itself or as part of another substituent, refers to alkyl groups that are divalent, i.e., with two single bonds for attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—CH($CH_3$)—), 1-methyl-ethylene (—CH($CH_3$)—$CH_2$—), n-propylene (—$CH_2$—$CH_2$—$CH_2$—), 2-methylpropylene (—$CH_2$—CH ($CH_3$)—$CH_2$—), 3-methylpropylene (—$CH_2$—$CH_2$—CH ($CH_3$)—), n-butylene (—$CH_2$—$CH_2$—$CH_2$—$CH_2$—), 2-methylbutylene (—$CH_2$—CH($CH_3$)—$CH_2$—$CH_2$—), 4-methylbutylene (—CH$_2$—CH$_2$—CH$_2$—CH(CH$_3$)—), pentylene and its chain isomers, hexylene and its chain isomers, heptylene and its chain isomers, octylene and its chain isomers, nonylene and its chain isomers, decylene and its chain isomers, undecylene and its chain isomers, dodecylene and its chain isomers. When a subscript is used herein following a carbon atom, the subscript refers to the number of carbon atoms that the named group may contain. For example, C$_1$-C$_{20}$ alkylene refers to an alkylene having between 1 and 20 carbon atoms.

Exemplary halogen atoms include chlorine, bromine, fluorine and iodine, wherein fluorine and chlorine are preferred.

The metallocene catalysts used herein are preferably provided on a solid support. The support can be an inert organic or inorganic solid, which is chemically unreactive with any of the components of the conventional metallocene catalyst. Suitable support materials for the supported catalyst include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is a silica compound. In a preferred embodiment, the metallocene catalyst is provided on a solid support, preferably a silica support. The silica may be in granular, agglomerated, fumed or other form.

In an embodiment, the support of the metallocene catalyst is a porous support, and preferably a porous silica support having a surface area comprised between 200 and 900 m$^2$/g. In another embodiment, the support of the polymerization catalyst is a porous support, and preferably a porous silica support having an average pore volume comprised between 0.5 and 4 ml/g. In yet another embodiment, the support of the polymerization catalyst is a porous support, preferably as described in US2013/0211018 A1, hereby incorporated in its entirety by reference.

In some embodiments, the support has a D50 of at most 150 μm, preferably of at most 100 μm, preferably of at most 75 μm, preferably of at most 50 μm, preferably of at most 25 μm, preferably of at most 15 μm, preferably of at most 10 μm, preferably of at most 8 μm. The D50 is defined as the particle size for which fifty percent by weight of the particles has a size lower than the D50.

The measurement of the particle size can be made according to the International Standard ISO 13320:2009 ("Particle size analysis—Laser diffraction methods").

For example, the D50 can be measured by sieving, by BET surface measurement, or by laser diffraction analysis. For example, Malvern Instruments' laser diffraction systems may advantageously be used. The particle size may be measured by laser diffraction analysis on a Malvern type analyzer. The particle size may be measured by laser diffraction analysis on a Malvern type analyzer after having put the supported catalyst in suspension in cyclohexane. Suitable Malvern systems include the Malvern 2000, Malvern MasterSizer (such as Mastersizer S), Malvern 2600 and Malvern 3600 series. Such instruments together with their operating manual meet or even exceed the requirements set-out within the ISO 13320 Standard. The Malvern MasterSizer (such as Mastersizer S) may also be useful as it can more accurately measure the D50 towards the lower end of the range e.g. for average particle sizes of less 8 μm, by applying the theory of Mie, using appropriate optical means.

In some embodiments, the support has a D50 of at most 150 μm, preferably of at most 100 μm, preferably of at most 75 μm, preferably of at most 50 μm, preferably of at most 25 μm, preferably of at most 15 μm, preferably of at most 10 μm, preferably of at most 8 μm. The D50 is defined as the particle size for which fifty percent by weight of the particles has a size lower than the D50, as measured according to the International Standard ISO 13320:2009 ("Particle size analysis—Laser diffraction methods") with the Mastersizer S by applying the theory of Mie.

Preferably, the supported metallocene catalyst is activated. The cocatalyst, which activates the metallocene catalyst component, can be any cocatalyst known for this purpose such as an aluminium-containing cocatalyst, a boron-containing cocatalyst or a fluorinated catalyst. The aluminium-containing cocatalyst may comprise an alumoxane, an alkyl aluminium, a Lewis acid and/or a fluorinated catalytic support.

In an embodiment, alumoxane is used as an activating agent for the metallocene catalyst. The alumoxane can be used in conjunction with a catalyst in order to improve the activity of the catalyst during the polymerization reaction.

As used herein, the term "alumoxane" and "aluminoxane" are used interchangeably, and refer to a substance, which is capable of activating the metallocene catalyst. In an embodiment, alumoxanes comprise oligomeric linear and/or cyclic alkyl alumoxanes. In a further embodiment, the alumoxane has formula (V) or (VI):

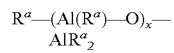  (V) for oligomeric, linear alumoxanes; or

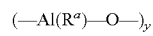  (VI) for oligomeric, cyclic alumoxanes wherein x is 1-40, and preferably 10-20; wherein y is 3-40, and preferably 3-20; and wherein each $R^a$ is independently selected from a C$_1$-C$_8$alkyl, and preferably is methyl. In a preferred embodiment, the alumoxane is methylalumoxane (MAO).

In a preferred embodiment, the metallocene catalyst is a supported metallocene-alumoxane catalyst comprising a metallocene and an alumoxane which are bound on a porous silica support. Preferably, the metallocene catalyst is a bridged bis-indenyl catalyst and/or a bridged bis-tetrahydrogenated indenyl catalyst.

One or more aluminiumalkyl represented by the formula AlR$^b_x$ can be used as additional co-catalyst, wherein each $R^b$ is the same or different and is selected from halogens or from alkoxy or alkyl groups having from 1 to 12 carbon atoms and x is from 1 to 3. Non-limiting examples are Tri-Ethyl Aluminum (TEAL), Tri-Iso-Butyl Aluminum (TIBAL), Tri-Methyl Aluminum (TMA), and Methyl-Methyl-Ethyl Aluminum (MMEAL). Especially suitable are trialkylaluminiums, the most preferred being triisobutylaluminium (TIBAL) and triethylaluminum (TEAL).

The catalyst is preferably added to the loop reactor as catalyst slurry. As used herein, the term "catalyst slurry" refers to a composition comprising catalyst solid particles and a diluent. The solid particles can be suspended in the diluent, either spontaneously or by homogenization techniques, such as mixing. The solid particles can be non-homogeneously distributed in a diluent and form sediment or deposit.

Suitable ethylene polymerization includes but is not limited to homopolymerization of ethylene, or copolymerization of ethylene and a higher 1-olefin co-monomer.

According to the invention, the polyethylene resin has a multimodal molecular weight distribution and comprises at least two polyethylene fractions A and B.

The at least two polyethylene fractions A and B can be chemically and/or physically blended. In an embodiment, the polyethylene resin for use herein can be produced by a method which comprises blending at least one fraction A with at least one fraction B. In some embodiments, fraction A is produced separately from fraction B, for example in two separates reactions, and both fractions can then blended together in a physical blending process.

Preferably, the polyethylene resin for use herein is produced by a method which comprises chemically blending at least one fraction A with at least one fraction B.

The polymerization of the metallocene-catalyzed polyethylene resin can be carried out in gas, solution or slurry phase. Slurry polymerization is preferably used to prepare the polyethylene resin, preferably in a slurry loop reactor or a continuously stirred reactor.

Preferably, the metallocene-catalyzed polyethylene resin is prepared in two or more serially connected reactors, comprising at least one first and at least one second reactors, preferably loop reactors, more preferably slurry loop reactors, most preferably liquid full loop reactors in the presence of same or different metallocene catalysts. The polyethylene resin is preferably obtained by operating the at least two reactors under different polymerization conditions.

In a preferred embodiment, each fraction is prepared in different reactors of at least two reactors connected in series. The polyethylene resin is preferably obtained by operating the at least two reactors under different polymerization conditions.

The most preferred polymerization process is carried out in two serially connected slurry loop reactors, advantageously liquid full loop reactors i.e. a double loop reactor.

As used herein, the terms "loop reactor" and "slurry loop reactor" may be used interchangeably herein.

In certain embodiments, each loop reactor may comprise interconnected pipes, defining a reactor path. In certain embodiments, each loop reactor may comprise at least two vertical pipes, at least one upper segment of reactor piping, at least one lower segment of reactor piping, joined end to end by junctions to form a complete loop, one or more feed lines, one or more outlets, one or more cooling jackets per pipe, and one pump, thus defining a continuous flow path for a polymer slurry.

The vertical sections of the pipe segments are preferably provided with cooling jackets. Polymerization heat can be extracted by means of cooling water circulating in these jackets of the reactor. The loop reactor preferably operates in a liquid full mode.

In certain embodiments, the process may be preceded by a pre-polymerization step. In certain embodiments, the pre-polymerization may be performed in a pre-polymerization (or further or third) slurry loop reactor connected in series with the first loop reactor. In certain embodiments, the pre-polymerization step may comprise pre-polymerizing ethylene in the presence of the metallocene catalyst in said pre-polymerization loop reactor connected in series with the first loop reactor.

In certain embodiments, the at least one first and at least one second loop reactors may be connected through means such as a transfer line or one or more settling legs. In some embodiments, the first polyethylene fraction may be transferred from the first loop reactor to the second loop reactor through a transfer line. In some embodiments, the first polyethylene fraction may be discharged in batches, sequentially or continuously from the first loop reactor through one or more settling legs, and transferred to the second loop reactor via a transfer line.

In a preferred embodiment, the polyethylene resin is prepared in at least two loop reactors connected in series, preferably under slurry condition.

In some embodiments, the polyethylene resin having a multimodal molecular weight distribution is prepared using a process comprising the steps of:

(a) feeding ethylene monomer, a diluent, at least one metallocene catalyst, optionally hydrogen, optionally one or more olefin co-monomers, optionally one or more anti-fouling agents, optionally an alkyl aluminium, into at least one first slurry loop reactor; polymerizing the ethylene monomer, and the optionally one or more olefin co-monomers, in the presence of the metallocene catalyst, and optional hydrogen, in said first slurry loop reactor to produce a first polyethylene fraction;

(b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, optionally one or more anti-fouling agents, thereby producing the polyethylene resin.

As used in the present invention, the term "anti-fouling agent" refers to material that prevents fouling of the inside of the reactor wall. Examples of suitable commercially available antifouling agents include but are not limited to those under the trade designation Armostat® (such as Armostat 300 (N,N-bis-(2-hydroxyethyl)-($C_{10}$-$C_{20}$)alkylamine, for example N,N-bis-(2-hydroxyethyl)-($C_{14}$-$C_{18}$)alkylamine), Armostat 410 LM (bis(2-hydroxyethyl)cocoamine), and Armostat® 600 (N,N-bis(2-hydroxy-ethyl)alkylamine) from Akzo Nobel Corporation; those under the trade designation Chemax X997® (>50% of dicocoalkyl-dimethyl ammonium chloride, about 35% 1-hexene, <2% isopropanol, and <1% hexane); those under the trade designation Atmer 163 (N,N-Bis(2hydroxy-ethyl) alkylamine) from ICI Americas; those under the trade designation Statsafe 6000 (dodecylbenzenesulfonic acid) from Innospec Limited; those under the trade designation Octastat® 3000 (about 40-50% toluene, about 0-5% propan-2-ol, about 5-15% DINNSA (dinonyinaphthasulphonic acid), about 15-30% solvent naptha, about 1-10% trade secret polymer containing N, and about 10-20% trade secret polymer containing S) from Octel Performance Chemicals; those under the trade designation Kerostate 8190 (about 10-20% alkenes (polymer with sulfur dioxide), about 3-8% benzenesulfonic acid (4-C10-13-sec-alkyl derivatives) and organic solvent from BASF, those under the trade designation Stadis® 450 (about 14 wt % of polybutene sulfate, about 3 wt % of aminoethanolepichlorohydrin polymer, about 13 wt % of alkylbenzenesulfonic acid, about 70 wt % of toluene and trace amounts of quaternary ammonium salt of aliphatic alkyl and propyl alcohol) from E. I. Du Pont de Nemours & Co.; Synperonic PEL121 (ethyleneoxide-propyleneoxide-ethyleneoxide block copolymer, about 10% of propyleneoxide, MW about 4400 Da) from Uniqema and the like. A preferred example of anti-fouling agents for use in the invention is Synperonic PEL121.

Preferably, anti-fouling agent is used in the loop reactor at a level of from 0.1 to 50 ppm in the polymer slurry, preferably from 0.2 to 20 ppm, preferably from 0.5 to 10 ppm, for example from 1.0 to 5.0 ppm, for example from 1.0 to 3.0 ppm, preferably wherein the anti-fouling agent is Synperonic PEL121.

In an preferred embodiment, the polyethylene resin has a bimodal molecular weight distribution and comprises two polyethylene fractions A and B, fraction A having a lower molecular weight and a higher density than fraction B, with each fraction being prepared in different reactors of two slurry loop reactors connected in series.

In some embodiments, the polyethylene resin having a bimodal molecular weight distribution is prepared using a process comprising the steps of:
(a) feeding ethylene monomer, a diluent, at least one metallocene catalyst, optionally hydrogen, and optionally one or more olefin co-monomers into a first slurry loop reactor; optionally one or more anti-fouling agents, optionally an alkyl aluminium, polymerizing the ethylene monomer, and the optionally one or more olefin co-monomers, in the presence of the metallocene catalyst, and optional hydrogen, in said first slurry loop reactor to produce a first polyethylene fraction;
(b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, optionally one or more anti-fouling agents, thereby producing the polyethylene resin.

As used herein, the term "co-monomer" refers to olefin co-monomers which are suitable for being polymerized with ethylene monomers. Co-monomers may comprise but are not limited to aliphatic $C_3$-$C_{20}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. Preferably, the co-monomer is 1-hexene.

As used herein, the term "diluent" refers to diluents in a liquid state, liquid at room temperature and preferably liquid under the pressure conditions in the loop reactor. Diluents which are suitable for being used in accordance with the present invention may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are isobutane, butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane.

In an embodiment, the polyethylene resin comprised in the pipe has a multimodal molecular weight distribution and comprises at least two polyethylene fractions A and B, fraction A having a lower molecular weight and a higher density than fraction B, each fraction prepared in different reactors of at least two reactors connected in series.

While preferably the fraction A can be produced in the first reactor and the fraction B is synthesized in the presence of fraction A in the second loop reactor serially connected to the first reactor, the opposite order is also possible. The molecular weight in each of the reactors can be regulated by known techniques such as varying the amount of hydrogen used.

In some embodiments, the polyethylene resin having a bimodal molecular weight distribution is prepared using a process comprising the steps of:

(a) feeding ethylene monomer, a diluent, at least one metallocene catalyst, hydrogen, optionally one or more anti-fouling agents, optionally an alkyl aluminium, into a first slurry loop reactor; polymerizing the ethylene monomer, in the presence of the metallocene catalyst, and hydrogen, in said first slurry loop reactor to produce a first polyethylene fraction;
(b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, optionally one or more anti-fouling agents, thereby producing the polyethylene resin.

In some preferred embodiments, the polyethylene resin having a bimodal molecular weight distribution is prepared using a process comprising the steps of:
(a) feeding ethylene monomer, a diluent, at least one metallocene catalyst, optionally hydrogen, optionally one or more anti-fouling agents, optionally an alkyl aluminium, into a first slurry loop reactor; polymerizing the ethylene monomer, in the presence of the metallocene catalyst, and hydrogen, in said first slurry loop reactor to produce a first polyethylene fraction A; and
(b) feeding the first polyethylene fraction A to a second slurry loop reactor serially connected to the first slurry loop reactor, and in the second slurry loop reactor polymerizing ethylene, in the presence of the first polyethylene fraction A, and optional comonomer, optionally one or more anti-fouling agents, thereby producing the polyethylene resin comprising fraction A and a fraction B, wherein fraction A has a lower molecular weight and a higher density than fraction B. Preferably the comonomer is 1-hexene.

In a preferred embodiment, reactants comprises the monomer ethylene, isobutane as hydrocarbon diluent, a supported metallocene catalyst, and optionally at least one co-monomer such as 1-hexene are used.

The polymerization steps in the at least two loop reactors, i.e. in the first loop reactor and the second loop reactor, can be performed over a wide temperature range. In certain embodiments, the polymerization step in the first loop reactor and/or in the second loop reactor may be performed at a temperature from 20° C. to 125° C., preferably from 60° C. to 110° C., more preferably from 75° C. to 105° C. and most preferably from 78° C. to 101° C. Preferably, the temperature in the first loop reactor and in the second loop reactor range may be within the range from 75° C. to 100° C. and most preferably from 80° C. to 100° C.

In certain embodiments, the polymerization step in the first loop reactor and/or in the second loop reactor may be performed at a pressure from about 20 bar to about 100 bar, preferably from about 30 bar to about 50 bar, and more preferably from about 37 bar to about 45 bar.

In some preferred embodiments, the polyethylene resin has a rheology long chain branching index $g_{rheo}$ of at most 0.90, for example at most 0.80, for example at most 0.70, for example at most 0.65. As used herein the long chain branching (LCB) index $g_{rheo}$ can be obtained by rheology according to the formula, as described in WO 2008/113680:
$g_{rheo}(PE)-M_w(SEC)/M_w(\eta_0, MWD, SCB)$
wherein Mw (SEC) is the weight average molecular weight obtained from size exclusion chromatography expressed in kDa, and wherein Mw ($\eta_0$, MWD, SCB) is determined according to the following, also expressed in kDa: $M_w$ ($\eta_0$, MWD, SCB)=exp(1.7789+0.199769 Ln $M_n$+0.209026 (Ln $\eta_0$)+0.955 (ln ρ)−0.007561 (ln $M_z$) (Ln $\eta_0$)+0.02355 (ln $M_z$)$^2$)

As used herein, the zero shear viscosity $\eta_0$ in Pa*s is obtained from a frequency sweep experiment combined with a creep experiment, in order to extend the frequency range to values down to $10^{-4}$ s$^{-1}$ or lower, and taking the usual assumption of equivalence of angular frequency (rad/s) and shear rate. Zero shear viscosity $\eta_0$ is estimated by fitting with Carreau-Yasuda flow curve (η-W) at a temperature of 190° C., obtained by oscillatory shear rheology on ARES-G2 equipment (manufactured by TA Instruments) in the linear viscoelasticity domain. Circular frequency (W in rad/s) varies from 0.05-0.1 rad/s to 250-500 rad/s, typically 0.1 to 250 rad/s, and the shear strain is typically 10%. In practice, the creep experiment is carried out at a temperature of 190° C. under nitrogen atmosphere with a stress level such that after 1200 s the total strain is less than 20%. The apparatus used is an AR-G2 manufactured by TA instruments.

As used herein, the molecular weight ($M_n$ (number average molecular weight), $M_w$ (weight average molecular weight) and molecular weight distributions d (Mw/Mn), and d' (Mz/Mw) were determined by size exclusion chromatography (SEC) and in particular by gel permeation chromatography (GPC). Briefly, a GPC-IR5 from Polymerchar was used: 10 mg polyethylene sample was dissolved at 160° C. in 10 ml of trichlorobenzene for 1 hour. Injection volume: about 400 μl, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 ml/min. Detector: Infrared detector (2800-3000 cm$^{-1}$). Calibration: narrow standards of polystyrene (PS) (commercially available). Calculation of molecular weight Mi of each fraction i of eluted polyethylene is based on the Mark-Houwink relation ($\log_{10}(M_{PE})$= 0.965909×$\log_{10}(M_{PS})$−0.28264) (cut off on the low molecular weight end at $M_{PE}$=1000).

The molecular weight averages used in establishing molecular weight/property relationships are the number average ($M_n$), weight average ($M_w$) and z average ($M_z$) molecular weight. These averages are defined by the following expressions and are determined from the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

The polyethylene resin has a density of at least 0.9420 g/cm$^3$ and at most 0.9460 g/cm$^3$, preferably the polyethylene resin has a density of at least 0.9420 g/cm$^3$ and at most 0.9455 g/cm$^3$. In some preferred embodiments, the polyethylene resin has a density of at least 0.9425 g/cm$^3$ and at most 0.9455 g/cm$^3$, preferably at least 0.9430 g/cm$^3$ and at most 0.9455 g/cm$^3$, for example at least 0.9430 g/cm$^3$ and at most 0.9450 g/cm$^3$, preferably at least 0.9430 g/cm$^3$ and at most 0.9445 g/cm$^3$, preferably at least 0.9430 g/cm$^3$ and at most 0.9440 g/cm$^3$. In some embodiments, polyethylene fraction A has a density as measured on the fluff of at least 0.0050 g/cm$^3$ higher than the density of the polyethylene resin. In some embodiments the polyethylene resin has a density of at least 0.9420 g/cm$^3$ and at most 0.9455 g/cm$^3$. In some embodiments the polyethylene resin has a density of at most 0.9459 g/cm$^3$, for example of at most 0.9458 g/cm$^3$, for example of at most 0.9457 g/cm$^3$, for example of at most 0.9456 g/cm$^3$, for example of at most 0.9455 g/cm$^3$, for example of at most 0.9454 g/cm$^3$, for example of at most 0.9453 g/cm$^3$, for example of at most 0.9452 g/cm$^3$, for example of at most 0.9451 g/cm$^3$, for example of at most 0.9450 g/cm$^3$.

The density of the polyethylene resin can be measured using ASTM D-1505 at a temperature of 23° C. As used herein, the density of the polyethylene resin refers to the density of the polyethylene resin as pelletized, and not to the density of the polyethylene fluff. For highly accurate and reproducible measurements of the density of the polyethylene resin, a hydrostatic balance is preferably used, as set out below. This method can provide measurements of the density up to a standard deviation of 0.0003 g/cm$^3$ or 0.03%. The hydrostatic balance with an accuracy of 0.0001 g is installed in a room at 23° C. A beaker is filled with isopropanol and weighted in a container filled with deionized water. A basket is used, hung in the balance and plunged into the beaker. The density measurement of the polyethylene is based on two weight values: First, the exact density of isopropanol at the system temperature is measured. A "standard volume" in air and in solvent is measured, and introduced into Equation 1 for density of the medium:

$$d_{iso}=(P_{air}-P_{iso})/V \quad \text{Equation 1:}$$

wherein $d_{iso}$ is the density of isopropanol, $P_{air}$ is the weight of the "standard volume" in air, $P_{iso}$ is the weight of the "standard volume" in isopropanol and finally, V is the volume of the "standard volume". To determine the density of the polyethylene resin, it is weighed in air and in isopropanol and the values are introduced in Equation 2:

$$d_{ech}=(P_{air}\times d_{iso})/(P_{air}-P_{iso}) \quad \text{Equation 2:}$$

Where $d_{ech}$ is the sample density, $P_{air}$ is the sample weight in the air, $d_{iso}$ is the density of isopropanol, and $P_{iso}$ is the sample weight in isopropanol.

According to the invention, the polyethylene resin has a multimodal molecular weight distribution and comprises at least two metallocene-catalyzed polyethylene fractions A and B, prepared in different reactors of at least two reactors connected in series. To obtain the density of these separate fractions, the following procedure is preferably used:

The density of the fraction prepared in the first reactor (which can be fraction A or fraction B, in the examples this is fraction A) is obtained by analyzing some of the fluff of the fraction prepared in the first reactor, for example by analyzing some of the fluff exiting a settling leg of the reactor. The $MI_2$ of this fraction is measured in g/10 min according to ISO 1133:1997 Condition D at a temperature of 190° C. and under a load of 2.16 kg. The density of the fluff of the first fraction in g/cm³ is then calculated as $d_1=0.9578+0.002815*\ln(MI_2)$.

The density of the fraction prepared in the second reactor (which can be fraction B or fraction A, for instance, the fraction prepared in the second reactor in the example section is fraction B) is calculated from the density of the fraction prepared in the first reactor calculated from the $MI_2$, and from the density of the pelletized final polyethylene resin measured as described herein above, by using following equation:

$$d=0.9995*W_A*d_A+1.0046(1-W_A)*d_B$$

wherein d is the density of the final polyethylene pellets, $W_A$ is the weight fraction of fraction A, $d_A$ is the density of fraction A as calculated on the fluff, $d_B$ is the density of fraction B as calculated on the fluff, and wherein the sum of both fractions A and B by weight ($W_A+W_B$) is 1.

In an embodiment, fraction A has a density as measured on the fluff of at least 0.007 g/cm³ higher, for example 0.0070 g/cm³ higher, than the density of the polyethylene resin, preferably, fraction A has a density as measured on the fluff of at least 0.008 g/cm³ higher, for example 0.0080 g/cm³ higher, than the density of the polyethylene resin, preferably fraction A has a density as measured on the fluff of at least 0.010 g/cm³ higher, for example 0.0100 g/cm³ higher, than the density of the polyethylene resin, preferably fraction A has a density as measured on the fluff which is at least 0.015 g/cm³ higher, for example 0.0150 g/cm³ higher, than the density of the polyethylene resin, preferably fraction A has a density as measured on the fluff which is at least 0.020 g/cm³ higher, for example 0.0200 g/cm³ higher, than the density of the polyethylene resin, preferably fraction A has a density as measured on the fluff which is at least 0.030 g/cm³ higher, for example 0.0300 g/cm³ higher, than the density of the polyethylene resin, preferably fraction A has a density as measured on the fluff which is at least 0.040 g/cm³ higher, for example 0.0400 g/cm³ higher, than the density of the polyethylene resin. In some embodiments, fraction A has a density as measured on the fluff which is at most 0.40 g/cm³ higher, for example 0.0400 g/cm³ higher, than the density of the polyethylene resin In some embodiments, fraction A has a density as measured on the fluff of at least 0.955 g/cm³, for example of at least 0.9550 g/cm³, preferably of at least 0.958 g/cm³, for example of at least 0.9580 g/cm³, for example of at least 0.960 g/cm³, for example of at least 0.9600 g/cm³, for example of at least 0.963 g/cm³, for example of at least 0.9630 g/cm³, as measured according to ASTM D-1505 at a temperature of 23° C.

The density of fraction B is linked to that of the density of fraction A as measured on the fluff by the following expression:

$$d=0.9995*W_A*d_A+1.0046(1-W_A)*d_B$$

wherein d is the density of the final polyethylene fluff, $W_A$ is the weight fraction of fraction A, $d_A$ is the density of fraction A as measured on the fluff, $d_B$ is the density of fraction B, and wherein the sum of both fractions A and B by weight ($W_A+W_B$) is 1.

In some embodiments, fraction B has a density of at least 0.9080 g/cm³ and at most 0.9300 g/cm³, preferably of at least 0.9085 g/cm³ and at most 0.9290 g/cm³, for example of at least 0.9090 g/cm³ and at most 0.9280 g/cm³, for example of at least 0.9095 g/cm³ and at most 0.9270 g/cm³, for example of at least 0.9100 g/cm³ and at most 0.9260 g/cm³, for example of at least 0.9105 g/cm³ and at most 0.9250 g/cm³, for example of at least 0.9110 g/cm³ and at most 0.9240 g/cm³, for example of at least 0.9115 g/cm³ and at most 0.9230 g/cm³, for example of at least 0.9120 g/cm³ and at most 0.9220 g/cm³, for example of at least 0.9125 g/cm³ and at most 0.9210 g/cm³, for example of at least 0.9130 g/cm³ and at most 0.9200 g/cm³, as measured according to ASTM 1505 at a temperature of 23° C. In some embodiments, fraction B has a density of at most 0.9300 g/cm³, preferably of at most 0.9290 g/cm³, preferably of at most 0.9280 g/cm³, preferably of at most 0.9270 g/cm³, preferably of at most 0.9260 g/cm³, preferably of at most 0.9250 g/cm³, preferably of at most 0.9240 g/cm³, preferably of at most 0.9230 g/cm³, preferably of at most 0.9220 g/cm³, preferably of at most 0.9210 g/cm³, preferably of at most 0.9200 g/cm³, as measured according to ASTM 1505 at a temperature of 23° C. In some preferred embodiments, fraction B has a density of at most 0.9210 g/cm³, preferably of at most 0.9200 g/cm³. In some embodiments, fraction B has a density of at most 0.9217 g/cm³, for example of at most 0.9216 g/cm³, for example of at most 0.9215 g/cm³, for example of at most 0.9214 g/cm³, for example of at most 0.9213 g/cm³, for example of at most 0.9212 g/cm³, for example of at most 0.9211 g/cm³, for example of at most 0.9210 g/cm³, for example of at most 0.9209 g/cm³, for example of at most 0.9208 g/cm³, for example of at most 0.9207 g/cm³, for example of at most 0.9206 g/cm³, for example of at most 0.9205 g/cm³, for example of at most 0.9204 g/cm³, for example of at most 0.9203 g/cm³, for example of at most 0.9202 g/cm³, for example of at most 0.9201 g/cm³, for example of at most 0.9200 g/cm³.

In some embodiments, fraction B has a density of at most 0.9300 g/cm³, preferably of at most 0.9290 g/cm³, preferably of at most 0.9280 g/cm³, preferably of at most 0.9270 g/cm³, preferably of at most 0.9260 g/cm³, preferably of at most 0.9250 g/cm³, preferably of at most 0.9240 g/cm³, preferably of at most 0.9230 g/cm³, preferably of at most 0.9220 g/cm³, preferably of at most 0.9210 g/cm³, preferably of at most 0.9200 g/cm³, as measured according to ASTM 1505 at a temperature of 23° C., and wherein fraction B was prepared in the presence of at least one co-monomer, wherein the co-monomer is preferably selected from the group comprising aliphatic $C_3$-$C_{20}$ alpha-olefins, preferably from the group comprising propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene, preferably 1-hexene.

In some embodiments, fraction B has a density of at most 0.9300 g/cm³, preferably of at most 0.9290 g/cm³, preferably of at most 0.9280 g/cm³, preferably of at most 0.9270 g/cm³, preferably of at most 0.9260 g/cm³, preferably of at most 0.9250 g/cm³, preferably of at most 0.9240 g/cm³, preferably of at most 0.9230 g/cm³, preferably of at most 0.9220 g/cm³, preferably of at most 0.9210 g/cm³, preferably of at most 0.9200 g/cm³, as measured according to ASTM 1505 at a temperature of 23° C., and wherein fraction B was prepared in the presence of at least one co-monomer, wherein the co-monomer is 1-hexene.

As used herein, the HLMI is measured in g/10 min according to the procedure of ISO 1133:1997 condition G with a temperature of 190° C. and a load of 21.6 kg. The used die is an 8/2 die (length 8 mm, diameter 2 mm).

As used herein, the $MI_2$ is measured in g/10 min according to the procedure of ISO 1133:1997 Condition D at a temperature of 190° C. and under a load of 2.16 kg. The used die is an 8/2 die (length 8 mm, diameter 2 mm).

As used herein, the MI$_5$ is measured in g/10 min according to the procedure of ISO 1133:1997 Condition T at a temperature of 190° C. and under a load of 5.00 kg. The used die is an 8/2 die (length 8 mm, diameter 2 mm).

In some preferred embodiments, the polyethylene resin has a melt index MI$_5$ of at least 0.10 g/10 min and of at most 1.0 g/10 min, preferably at least 0.15 g/10 min and at most 0.80 g/10 min, preferably at least 0.15 g/10 min and at most 0.60 g/10 min.

In some preferred embodiments, the polyethylene resin has an HLMI of at least 2.0 g/10 min and at most 20.0 g/10 min, preferably of at least 4.0 g/10 min and at most 14.0 g/10 min, preferably of at least 5.0 g/10 min and at most 14.0 g/10 min, preferably of at least 7.0 g/10 min and at most 13.0 g/10 min, preferably of at least 9.0 g/10 min and at most 12.0 g/10 min, as measured according to the procedure of ISO 1133:1997 condition G with a temperature of 190° C. and a load of 21.6 kg.

In some embodiments, polyethylene fraction A has an MI$_2$ of at least 60 g/10 min. Preferably, fraction A has an MI$_2$ of at least 70 g/10 min. Preferably, fraction A has an MI$_2$ of at least 50 g/10 min and of at most 1000 g/10 min, preferably at least 60 g/10 min and of at most 500 g/10 min, preferably at least 70 g/10 min and of at most 300 g/10 min, preferably at least 70 g/10 min and of at most 250 g/10 min, preferably at least 70 g/10 min and of at most 230 g/10 min, preferably at least 70 g/10 min and of at most 200 g/10 min, preferably of at least 70 g/10 min and of at most 200 g/10 min.

Fraction A has a melt index MI$_2$ of at least 50 g/10 min. When fraction A is prepared in the first reactor, the MI$_2$ is measured on the fluff.

When fraction A is prepared in the second reactor, the MI$_2$ may be calculated as follows:

the HLMI of the final resin (pellets) and of fraction B (fluff) may be measured using the procedure of ISO 1133:1997 condition G with a temperature of 190° C. and a load of 21.6 kg;

the HLMI of the blend (final resin) and the HLMI of fraction B then result in the HLMI of fraction A using the following equation:

$$HLMI = 0.894 * W_B * Ln(HLMI_B) - 5.61 * (W_B)^2 + 0.9304 * Ln_{(HLMI_A)} - 0.0877 * (W_B * Ln(HLMI_A))^2$$

from the HLMI of fraction A, the MI$_2$ can be calculated as follows: $Ln(HLMI_A) = 3.6199 + 0.7647 * Ln(MI2_A)$ In some preferred embodiments, the ratio of the HLMI of the polyethylene resin (as measured on the polyethylene resin) to the HLMI of the polyethylene fraction B, and wherein when fraction B is prepared in the second reactor of at least two reactors connected in series, HLMI fraction B is calculated based on the other measured melt indexes and fraction contents of A and final resin is at most 100, preferably at most 90, preferably at most 80, preferably at most 70, preferably at most 60, preferably at most 50, as measured according to the procedure of ISO 1133:1997 condition G with a temperature of 190° C. and a load of 21.6 kg.

In some embodiments, when fraction B is prepared in the second reactor of at least two reactors connected in series, the ratio of the HLMI of the polyethylene resin to the HLMI of the polyethylene fraction B as calculated based on the other measured melt indexes and fraction contents of A and final resin is at least 10 and at most 50, preferably at least 20 and at most 45, preferably at least 25 and at most 45, preferably at least 30 and at most 45.

When fraction B is prepared in the second reactor, the HLMI of fraction B is calculated using the following expression, preferably when prepared in the presence of a THI metallocene catalyst: HLMI of the blend (final resin):

$$HLMI = 0.894 * W_B * Ln(HLMI_B) - 5.61 * (W_B)^2 + 0.9304 * Ln_{(HLMI_A)} - 0.0877 * (W_B * Ln(HLMI_A))^2$$

HLMI$_{fraction\ A}$ is linked to its MI$_2$ by $$Ln(HLMI_A) = 3.6199 + 0.7647 * Ln(MI2_A)$$

wherein HLMI is the HLMI of the polyethylene resin, W$_A$ is the weight fraction of fraction A, HLMI$_A$ is the HLMI of fraction A measured on the fluff, HLMI$_B$ is the HLMI of fraction B as calculated, and wherein the sum of both fractions A and B by weight ($W_A + W_B$) is 1.

When fraction B is prepared in the first reactor, the HLMI of fraction B can be measured on the fluff according to ISO 1133:1997 condition G with a temperature of 190° C. and a load of 21.6 kg.

In some embodiments, fraction B has a melt index HLMI of at most 2.0 g/10 min, as calculated based on the other measured melt indexes and fraction contents of A and final resin. In an embodiment, fraction B has a HLMI of at most 1.5 g/10 min, preferably at most 1.0 g/10 min, preferably of at most 0.5 g/10 min preferably at most 0.4 g/10 min, for example wherein fraction B has a HLMI of at least 0.01 g/10 min, for example at least 0.02 g/10 min, for example at least 0.04 g/10 min.

As used herein, the polydispersity index is defined by the ration M$_w$/M$_n$ of the weight average molecular weight M$_w$ to the number average molecular weight M$_n$ as determined by Size Exclusion Chromatography (SEC) as described herein.

In some embodiments, the polyethylene resin has a molecular weight distribution Mw/Mn of at most 40.0, preferably of at most 30.0, preferably of at most 25.0, preferably of at most 20.0, preferably of at most 15.0, preferably of at most 14.0, for example of at most 12.0, for example of at most 10.0, for example of at most 9.0, Mw being the weight-average molecular weight and Mn being the number-average molecular weight. In some embodiments, the polyethylene resin has a molecular weight distribution Mw/Mn of at least 5.0, preferably of at least 6.0, preferably of at least 6.5, preferably of at least 7.0. In some embodiments, the polyethylene resin has a molecular weight distribution Mw/Mn of at least 5.0 and at most 40.0, preferably of at most 30.0, preferably of at most 25.0, preferably of at most 20.0, preferably of at most 15.0, preferably of at most 14.0, preferably of at most 12.0, preferably of at most 10.0, preferably of at most 9.0; preferably of at least 6.0 and at most 40.0, preferably of at most 30.0, preferably of at most 25.0, preferably of at most 20.0, preferably of at most 15.0, preferably of at most 14.0, preferably of at most 12.0, preferably of at most 10.0, preferably of at most 9.0; preferably of at least 6.5 and at most 40.0, preferably of at most 30.0, preferably of at most 25.0, preferably of at most 20.0, preferably of at most 15.0, preferably of at most 14.0, preferably of at most 12.0, preferably of at most 10.0, preferably of at most 9.0, preferably of at least 6.7 and at most 40.0, preferably of at most 30.0, preferably of at most 25.0, preferably of at most 20.0, preferably of at most 15.0, preferably of at most 14.0, preferably of at most 12.0, preferably of at most 10.0, preferably of at most 9.0.

The slow crack growth resistance of the resins was tested by a full notch creep test (FNCT) according to ISO16770 in which the time for failure was recorded for a circumferentially notched (1600 µm depth) specimen having a 10 mm×10 mm cross section, taken from compressed-plates (compression from the melt at a cooling rate of 15° C./min.).

In some embodiments, the polyethylene resin has stress crack resistance of at least 6400 hours, preferably at least 8760 hours, preferably at least 10000 hours, as determined using the Full Notched Creep Test (FNCT) according to ISO 16770 performed at 80° C. under a 4.0 MPa constraint in 2% Arkopal N100.

The structure of Arkopal N100 is given below:

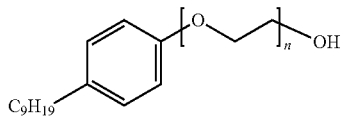

In some embodiments, the polyethylene resin has stress crack resistance of at least 320 hours, preferably at least 500 hours, preferably at least 1000 h, as determined using the Full Notched Creep Test (FNCT) according to ISO 16770 performed at 90° C. under a 4.0 MPa constraint in 2% NM-5 (test available in Hessel Ingenieurteckniek: http://www.hessel-ingtech.de/en/inhalt.html).

In some embodiments, the polyethylene resin has stress crack resistance of at least 1700 hours, preferably at least 2700 hours, as determined using the Full Notched Creep Test (FNCT) according to ISO 16770 performed at 80° C. under a 4.0 MPa constraint in in a solution of 0.5 wt % Maranil in water.

As used herein, the term "Maranil" or "Maranyl" refers to Maranil Paste A55, CASR-No. 68411-30-3, Sodium Dodecylbenzenesulfonate.

In some embodiments, the polyethylene resin has a viscosity of at least 300 000 Pa*s, preferably of at least 350 000 Pa*s, as measured using Rheological Dynamic Analysis at 190° C. at a frequency of $10^{-2}$ rad/s.

In some embodiments, the polyethylene resin further comprises at least one processing aid. Suitable processing aids for use in the present invention are fluorine- or silicon-based processing aids. Preferred processing aids for use in the present invention are fluoropolymers including fluoro elastomers and crystalline or semi-crystalline fluoroplastics or blends thereof. The fluoropolymer to be blended with the polyethylene resin may be any polymer containing fluorine. The fluoropolymers as a class can be crystalline or generally amorphous. Exemplary of commercially available processing aids suitable for use in the present invention include materials available under the following designations: DuPont's Viton Freeflow Z100, Viton Freeflow Z110, Viton Freeflow Z200, Viton Freeflow Z210, Viton Freeflow Z300, Viton Freeflow 10, Viton Freeflow RC; 3M's Dynamar FX 5911, Dynamar FX 5912, Dynamar FX 5920A, Dynamar FX 5926, Dynamar FX 5927, Dynamar FX 9613, Dynamar FX 9614; Daikin's DAI-EL DA-410, DAI-EL DA-910 and Solvay's Tecnoflon NM and SOLEF 11010. A suitable class of fluoropolymer for use in the present invention is a polymer derived from one or more of the following materials: vinylidene fluoride, hexafluoropropylene and tetrafluoroethylene.

The processing aid can be added as a masterbatch or neat, in any stage of the production (for example, during pelletizing, compounding or at the pipe production line), as is generally known in the art.

For example, the polyethylene resin can comprise at least 50 ppm of at least one processing aid, preferably at least 100 ppm, preferably at least 200 ppm, of at least one processing aid, preferably a silicon- or fluorine-based processing aid, for example a fluoroelastomer.

The polyethylene resin may be used together with additive packages which operate synergistically for the environment of a pipe, for use in for example chlorinated water supply. For example antioxidants and other additives may be chosen for performance with respect to the atmosphere external to the pipe and also for performance with respect to the chlorine exposure in the interior of the pipe.

Preferred antioxidants may be found in Zweifel, Hans, ISBN 354061690X, Springer-Verlag 1998. Preferred antioxidants are Irganox 1010 and Irgafos 168, as shown below.

Irganox 1010: Tetra-phenols:

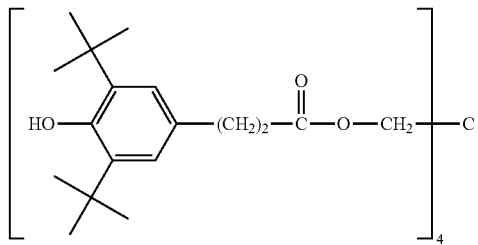

Irgafos 168:

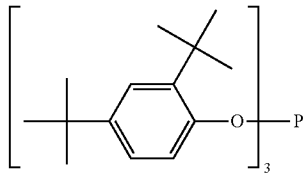

Calcium stearate may be added as a processing aid.

The polyethylene resins used for pipes according to the invention may contain other auxiliary materials, such as fillers and/or stabilizers and/or antistatic agents and/or pigments and/or reinforcing agents, e.g. glass fibres, or anti-UV.

In some preferred embodiments, the polyethylene resin comprises pigments. The specific color of the pigment may depend on the fluid to be carried in the pipes (water or gas) and on the country (depending on the impose legislation).

The polyethylene resins used for pipes according to the invention may contain for example up to 40% by weight of fillers and/or 0.01% to 2.5% by weight of stabilizers and/or 0.1% to 1% by weight of antistatic agents and/or 0.2% to 3% by weight of pigments and/or 0.2% to 3% by weight of reinforcing agents, in each case based on the total weight of the polyethylene resins used.

The pipe comprising the polyethylene resin surprisingly shows improved hydrostatic creep resistance. In some embodiments, the pipe has hydrostatic pressure test resistance at 10 MPa and 20° C. of at least 50 years, wherein the time is extrapolated performed based on a "log imposed constraint–log failure time" extrapolation as recommended in ISO 9080 norm; and wherein the hydrostatic pressure test resistance is measured on 32 mm SDR 11 pipes, wherein SDR is the ratio of external diameter to thickness.

The term "pipe" as used herein is meant to encompass pipes in the narrower sense, as well as supplementary parts like fittings, valves and all parts which are commonly necessary for e.g. a hot water piping system.

Pipes according to the invention also encompass single and multilayer pipes, where for example one or more of the layers is a metal layer and which may include an adhesive layer. Other constructions of pipes, e.g. corrugated pipes, are possible as well.

Pipes according to the invention can be produced by first plasticizing the polyethylene resin in an extruder at temperatures in the range of from 200° C. to 250° C. and then extruding it through an annular die and cooling it.

The extruders for producing the pipes can be single screw extruders or twin screw extruders or extruder cascades of homogenizing extruders (single screw or twin screw). To produce pellets from the fluff (when homogenizing and introducing the additives), a single screw extruder can be used, preferably with an L/D of 20 to 40, or twin screw extruders, preferably with an L/D of 20 to 40, preferably an extruder cascade is used. In some embodiments, supercritical $CO_2$ or water are used during extrusion to help homogenization. Variations could be considered like the use of supercritical $CO_2$ to help homogenization, use of water during extrusion. Optionally, a melt pump and/or a static mixer can be used additionally between the extruder and the ring die head. Ring shaped dies with diameters ranging from approximately 16 to 2000 mm and even grater are possible.

The melt arriving from the extruder can be first distributed over an annular cross-section via conically arranged holes and then fed to the core/die combination via a coil distributor or screen. If necessary, restrictor rings or other structural elements for ensuring uniform melt flow may additionally be installed before the die outlet.

After leaving the annular die, the pipe can be taken off over a calibrating mandrel, usually accompanied by cooling of the pipe by air cooling and/or water cooling, optionally also with inner water cooling.

The invention will now be illustrated by the following, non-limiting illustrations of particular embodiments of the invention.

EXAMPLES

Test Methods:

Unless otherwise stated, the density was measured according to the method of standard ASTM 1505 at a temperature of 23° C., using the hydrostatic balance as described herein above.

The density of the fraction A was obtained by removing some of the fluff of fraction A from the settling legs. Subsequently, the $MI_2$ of fraction A was measured in g/10 min according to the procedure of ISO 1133:1997 Condition D at a temperature of 190° C. and under a load of 2.16 kg. The density of the fluff of fraction A in g/cm³ was then calculated as $d_A=0.9578+0.002815*\ln(MI_2)$.

The density of the fraction B is then calculated based on the density of the fraction A as obtained above, and the density of the final polyethylene resin as pelletized, as measured according to ASTM D-1505 at a temperature of 23° C., by using following equation:

$$d=0.9995*W_A*d_A+1.0046(1-W_A)*d_B$$

wherein d is the density of the final polyethylene pellets, $W_A$ is the weight fraction of fraction A, $d_A$ is the density of fraction A as measured/calculated on the fluff, $d_B$ is the density of fraction B as measured/calculated on the fluff, and wherein the sum of both fractions A and B by weight ($W_A+W_B$) is 1.

Melt Indexes:

The melt index $MI_2$ was measured according to the method of standard ISO 1133, condition D, at 190° C. and under a load of 2.16 kg.

High load melt index HLMI was measured according to the method of standard ISO 1133, condition G, at 190° C. and under a load of 21.6 kg.

The melt index $MI_5$ was measured according to the method of standard ISO 1133, condition T, at 190° C. and under a load of 5 kg.

FNCT: The slow crack growth resistance of the resins was tested by a full notch creep test (FNCT) according to ISO DIS 16770-3 in which the time for failure was recorded for a circumferentially notched (1600 μm depth) specimen having a 10 mm×10 mm cross section, taken from compressed-plates (compression from the melt at a cooling rate of 15° C./min.). According, to ISO DIS 16770-3 the specimens are placed in a surfactant solution of 2 wt % (in water) Arkopal N100, at a temperature of 80° C., for an extended period of time, and subjected to a tensile stress equal to 4 MPa. To be qualified as "RC", the pipe must resist more than one year (8760 h) in 2% Arkopal N100 (also known under the name Igepal CO530), at 80° C. under a 4.0 MPa constraint.

For some of the tested resins, an ACT ("Accelerated Creep Test") according to Dr Hessel was performed. As with the FNCT, the "Accelerated Creep Test" was carried out at a raised temperature, in the wetting agent NM-5 and it shortens the time before breakage by a factor of at least 4 relative to wetting agent Arkopal N 100. This allows reasonable, short standing times for testing resistance to slow cracking. In the ACT test, the specimens were placed in a surfactant solution of 2.0 wt % (in water) NM-5 (from the testing institute "Dr. Hessel Ingenieurtechnik GmbH" in Roetgen-Germany), at a temperature of 90° C., for an extended period of time, and subjected to a tensile stress equal to 4 MPa. To be qualified as "RC" (Resist to Crack) with NM-5, the specimen had to resist for at least 320 hours, at 90° C. under a 4.0 MPa constraint.

For some of the tested resins, a variant of the FNCT test was used wherein, instead of Arkopal N100, the specimens were placed in a surfactant solution of 0.5 wt % (in water) Maranil Paste A 55 from Cognis (Sodium Dodecylbenzenesulfonate, CAS 68411-30-3), at a temperature of 80° C., and subjected to a tensile stress equal to 4 MPa. From a comparison of break times obtained with the same sample measured in NM-5 (test performed in Hessel Ingenieuteckniek) and in Maranil A55 (with previous described conditions), there is a 5.3 factor between the measured break times (320 h in Hessel Ingenieuteckniek (NM5) conditions correspond to 1700 h when measured in Maranil at 80 C and imposing 4 MPa). To be qualified as "RC" (Resist to Crack) with Maranil A55, the specimen had to resist for at least 1700 hours at 80° C. under a 4.0 MPa constraint.

Charpy Strength: Cold temperature Charpy impact strength was measured according to ISO 179 at −25° C.

Molecular Weights: The molecular weight ($M_n$ (number average molecular weight), $M_w$ (weight average molecular weight) and molecular weight distributions d (Mw/Mn), and d' (Mz/Mw) were determined by size exclusion chromatography (SEC) and in particular by gel permeation chromatography (GPC). Briefly, a GPC-IR5 from Polymer Char was used: 10 mg polyethylene sample was dissolved at 160° C. in 10 ml of trichlorobenzene for 1 hour. Injection volume: about 400 μl, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 ml/min. Detector: Infrared detector (2800-3000 cm$^{-1}$). Calibration: narrow standards of polystyrene (PS) (commercially available). Calculation of molecular weight Mi of each fraction i of eluted polyethylene is based on the Mark-Houwink relation ($\log_{10}(M_{PE})$= 0.965909×$\log_{10}(M_{PS})$−0.28264) (cut off on the low molecular weight end at $M_{PE}$=1000).

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight $M_i$. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

Dynamic Rheometry Analysis: Dynamic rheometry analysis (RDA) was performed on an ARES rheometer from Ta Instruments. This method has been extensively described in the literature devoted to polymer rheology (see e.g. W. W. Graessley, Chapter 3 in Physical Properties of Polymers, 2nd Edition, ACS Professional Reference Book, Washington D.C., 1993). The measurements are performed on a ARES rheometer between two 25 mm diameter plates; the gap between the plates is between 1 and 2 mm, and is thoroughly adapted according to the suitable thickness of the polymer sample once this latter has been inserted between the plates and warmed up to 190° C. The gap value is then recorded to be taken into account by the calculation software. The sample is then temperature-conditioned for a period of 5 minutes before the measurement is started. The measurement was performed at 190° C., 200° C., and 210° C. After temperature conditioning, the measurement starts by applying an oscillatory strain $\gamma^*(\omega,t)=\gamma_m \cdot e^{i\omega t}$, with a given amplitude $\gamma_M$ and a given frequency $\omega$ to the bottom plate via a precision motor, whereas the top plate is kept fixed. The amplitude $\gamma_M$ of this shear strain has been chosen in the linear zone of viscoelasticity of the polymer and is kept constant through the whole requirement experiment. The oscillation frequency $\omega$ is varied through the range $10^{-2}$-300 radians/second. The oscillating shear strain is translated inside the material into an oscillating shear stress $\sigma^*(\omega,t)$, which in-phase and out-of-phase components are recorded as functions of the frequency $\omega$, and used for the calculation of the complex modulus $G^*(\omega)$ as well as complex viscosity $\eta^*(\omega)$ of the polymer:

$$G^*(\omega) = \frac{\sigma^*(\omega,t)}{\gamma^*(\omega,t)} = G_m(\omega) \cdot e^{i\delta(\omega)} = G'(\omega) + i \cdot G''(\omega)$$

$$G_m(\omega) = \sqrt{G'^2(\omega) + G''^2(\omega)} \, ; \tan\delta(\omega) = \frac{G''(\omega)}{G'(\omega)}$$

$$\eta^*(\omega) = \eta'(\omega) - i \cdot \eta''(\omega) = \frac{G''(\omega)}{\omega} - i \cdot \frac{G'(\omega)}{\omega}$$

$$\|\eta^*(\omega)\| = \frac{\sqrt{G'^2(\omega) + G''^2(\omega)}}{\omega}$$

Cross-over points Gc (G'=G") and ωc (ω where G'=G") were also determined.

Pipes: Pipes (diameter 32 mm and SRD11) were produced using standard conditions, by extrusion of pellets through a single screw extruder (Reifenhauser extruder) with an annular die at a temperature of 200° C. A caliber was used to control the SRD. The pipe was solidified during a cooling process in water at 15° C. The SDR is the ratio of pipe diameter to wall thickness and the SDR can be expressed as SDR=D/s where D=pipe outside diameter (mm) and s=pipe wall thickness (mm)

A SDR 11 means that the outside diameter—D—of the pipe is eleven times the thickness—s—of the wall.

Hydrostatic Creep Resistance: Hydrostatic creep resistance was typically measured according to ISO 1167 on 32 mm diameter SDR11 pipes to determine the lifetime prior to failure at a temperature of 20° C. and a stress of 11.2 MPa, 11.5 MPa, 12 MPa, 12.5 MPa, and/or 13 MPa; and/or at a temperature of 80° C. and a stress of 5.5 MPa, 5.7 MPa, 6 MPa, and/or 6.3 MPa.

Flexibility: The flexion test used to characterize the pipe flexibility has been adapted from the ISO 178 three-point bending test. The sole difference was that the polymer sample has been replaced by a 40 cm pipe segment (diameter 32 mm—SDR 11). The pipe segment was introduced in the Zwick type 1445 machine, in the center of a three-point bending test (span=200 mm). During the test, the force is applied at the center of the span, also corresponding to the center of the pipe segment. The specific conditions for the test are (if a parameter or condition test is not mentioned, this means that its value is the same as the one imposed for the measurement of the flexural modulus of a polymer sample based on the ISO 178 three-points bending test):

Radius of the loading edge: 10 mm
Radius of the supports: 5 mm
Pre-charge: 5 N
Test speed: 1 mm/min
Temperature: 23° C.

The force as a function of the elongation is recorded. The lower the force, the more flexible is the pipe.

Comonomer Content: The comonomer content (hexene in the examples) (mol % and weight %) was determined by $C^{13}$NMR.

Example 1

Polyethylene resins: Resins having bimodal molecular weight distribution (polyethylene resins 1 to 5 and the comparative polyethylene resins 6 and 7) were prepared in two serially connected slurry loop reactors (double loop reactor) under the conditions as given below in Table 1. The polyethylene resins were prepared in the presence of dimethylated ethylene bis(tetrahydroindenyl) zirconium catalyst.

The characteristic and properties of the resins are shown in Table 1 and were determined as described herein above. The properties of fraction A, prepared in reactor 1, were obtained directly from the fluff from reactor 1. The properties of the final fluff, prepared in reactor 2, were measured from the fluff exiting from reactor 2. The properties of fraction B, prepared in reactor 2, were obtained via calculation as described above. The properties of the final resin, exiting reactor 2, were measured on a sample after pelletization. For polyethylene resins 1 and 2, pelletization was performed in a co-rotating twin-screw extruder (Werner & Pfleiderer ZSK58). Two pelletization runs were performed per grade. For polyethylene resins 3 to 7, pelletization was performed in a co-rotating twin-screw extruder (Werner & Pfleiderer ZSK58) at 215° C.

TABLE 1

| RUNS | | | Polyethylene resin 1 | Polyethylene resin 2 | Polyethylene resin 3 | Polyethylene resin 4 | Polyethylene resin 5 | Comparative polyethylene resin 6 | Comparative polyethylene resin 7 |
|---|---|---|---|---|---|---|---|---|---|
| REACTOR 1 OPERATING CONDITIONS | PRESSURE | Bars | 40 | 40 | 40 | 40 | 40 | 40 | 40 |
| | TEMPERATURE | ° C. | 95 | 95 | 100 | 100 | 100 | 95 | 95 |
| | C2- | kg/h | 26.4 | 27 | 22 | 24 | 22 | 18 | 25.5 |
| | Comonomer (hexene) | Kg/h | 0 | 0 | 0 | 0 | 0 | 0 | 0 |
| | H2 | Nl/h | 53.5 | 48 | 45.0 | 45.0 | 40.0 | 45.0 | 42.0 |
| | isobutane | kg/h | 50 | 50 | 60 | 60 | 60 | 60 | 77 |
| CONTRIBUTION | Reactor 1 | wt % | 48.8 | 48.4 | 45.4 | 43.1 | 44.9 | 48.5 | 43.8 |
| RESIDENCE TIME | Reactor 1 | min | 62.7 | 63.4 | 65.8 | 64.9 | 65.8 | 68.5 | 53.3 |
| REACTOR 1 ANALYTICAL RESULTS | $MI_2$ Fraction A | g/10 min | 115 | 80 | 204.3 | 164.0 | 134.5 | 292.0 | 190 |
| | $MI_2$ Fraction A (rounded) | g/10 min | 115 | 80 | 204 | 164 | 135 | 292 | 190 |
| | $MI_5$ | g/10 min | | | 8.4 | 8.5 | 8.6 | | |
| | HLMI | g/10 min | | | 24.4 | 19.3 | 15.8 | | |
| | Density of fraction A (calculated from $MI_2$) | g/cm$^3$ | 0.9712 | 0.9701 | 0.9728 | 0.9722 | 0.9716 | 0.9738 | 0.9726 |
| | Density of fraction A (measured according to ASTM) | g/cm$^3$ | 0.9715 | 0.971 | 0.9730 | 0.9720 | 0.9720 | 0.9740 | |
| REACTOR 2 OPERATING CONDITIONS | TEMPERATURE | ° C. | 80 | 80 | 80 | 80 | 80 | 85 | 80 |
| | C2- | kg/h | 27 | 27 | 26 | 30 | 26 | 22 | 30 |
| | Comonomer (hexene) | Kg/h | 3.4 | 4.3 | 2.5 | 2.0 | 3.0 | 1.7 | 1.9 |
| | H2 | Nl/h | 0 | 0 | 0 | 0 | 0 | 0 | 0 |
| | isobutane | kg/h | 45 | 45 | 45 | 45 | 45 | 40 | 45 |
| RESIDENCE TIME | Reactor 2 | min | 34.2 | 34.6 | 35.3 | 34.2 | 35.3 | 39.1 | 30.7 |
| REACTOR 2 FINAL FLUFF ANALYTICAL RESULTS | $MI_2$ | g/10 min | 0.002 | 0.004 | 0.2 | 0.1 | 0.2 | | |
| | $MI_5$ | g/10 min | | | 1.2 | 0.3 | 1.1 | 0.8 | 0.57 |
| | HLMI | g/10 min | 44.3 | 42.5 | 31.6 | 8.1 | 25.2 | 26.0 | 15.6 |
| | SR2 | | | | 154 | 135 | 123 | | |
| | SR5 | | | | 27.05 | 25.31 | 23.98 | 33.00 | |
| | DENSITY | g/cm$^3$ | 0.9438 | 0.9431 | 0.9456 | 0.9450 | 0.9438 | 0.9479 | 0.9459 |
| PELLETS ANALYTICAL RESULTS | $MI_2$ | g/10 min | | | 0.1 | | 0.1 | 0.1 | |
| | $MI_5$ | g/10 min | 0.53 | 0.39 | 0.38 | 0.17 | 0.47 | 0.35 | 0.26 |
| | HLMI | g/10 min | 11.3 | 8.5 | 10.8 | 5.5 | 11.9 | 11.8 | 6 |
| | SR2 | | 98 | 99 | 128 | | 107 | 159 | |
| | SR5 | | | | 22.65 | | 21.55 | 28 | |
| | DENSITY | g/cm$^3$ | 0.9438 | 0.9431 | 0.9452 | 0.9445 (+Viton 0.9453) | 0.9440 (+Carbon black 0.9449) | 0.9496 | 0.9462 |
| | Mn | kDa | 19.4 | 21.3 | 19.5 | 21.3 | 20.8 | 16.5 | 24 |
| | Mw | kDa | 137 | 147 | 171 | 191 | 158 | 167 | 168 |
| | D | Mw/Mn | 7.1 | 6.9 | 8.77 | 8.97 | 7.6 | 10.12 | 7 |
| | Mz | kDa | 457 | 472 | 670 | 693 | 576 | 620 | 524 |
| | g rheo | | 0.53 | 0.47 | 0.62 | 0.61 | 0.58 | 0.52 | |
| | Charpy −25° C. | kJ/m$^2$ | | | 17 | 22.4 | 13.5 | 21.3 | 25.5 |
| failure time | FNCT | hours | >1659 in NM5 at 90° C. (>7500 h ISO arkopal) | >1659 in NM5 at 90° C. (>7500 h ISO arkopal) | >3200 in Maranyl (>11200 h ISO arkopal) | >2500 in Maranyl (>8800 h ISO arkopal) | >3600 in Maranyl (>12600 h ISO arkopal) | 230 in Maranyl (800 h ISO arkopal) | 412 in Maranyl (1400 h ISO arkopal) |
| | Calc. wt % fraction B | % wt | 51.2 | 51.6 | 54.6 | 56.9 | 55.1 | 51.5 | 56.2 |
| | Calc. HLMI fraction B | g/10 min | 0.334 | 0.238 | 0.53 | 0.22 | 0.88 | 0.19 | 0.25 |

TABLE 1-continued

| RUNS | | | Polyethylene resin 1 | Polyethylene resin 2 | Polyethylene resin 3 | Polyethylene resin 4 | Polyethylene resin 5 | Comparative polyethylene resin 6 | Comparative polyethylene resin 7 |
|---|---|---|---|---|---|---|---|---|---|
| | Calc. density fraction B | g/cm$^3$ | 0.9140 | 0.9140 | 0.9185 | 0.9197 | 0.9177 | 0.9230 | 0.9218 |
| | Calc. density fraction B (rounded) | g/cm$^3$ | 0.9140 | 0.9140 | 0.9190 | 0.9200 | 0.9180 | 0.9230 | |
| | comonomer content | wt % | 1.8 | 1.8 | | | | | |
| | Comonomer content | mole % | 0.6 | 0.6 | | | | | |
| | HLMI PE resin/HLMI fraction B | | 33.83 | 35.71 | 20.38 | 25.00 | 13.52 | 62.10 | 21.2 |

For PE resins 1 and 2, the ACT ("Accelerated Creep Test") according to Dr Hessel was used. From the results in Table 1, it can be seen that pipes made with resins 1 and 2 can be qualified as "RC" (Resist to Crack).

For PE resins 3 to 6, the variant of the FNCT test was used wherein, instead of Arkopal N100, the specimens were placed in a surfactant solution of 0.5 wt % (in water) Maranil Paste A 55, at a temperature of 80° C., under a 4.0 MPa constraint. From the results in Table 1, it can be seen that pipes made with resins 3, 4 and 5 can be qualified as "RC" (Resist to Crack); which is not the case for comp. resin 6, which broke at 230 h in Maranil.

Resin ER-2 of WO 2014/016318, herein denoted as Comparative resin 7 in Table 1, with a density of 0.9462 g/cm$^3$, was submitted to the same FNCT test as stated above for resins 3-6. The specimen with resin ER-2 broke at 412 hours in Maranil, and did not qualify as "RC" (Resist to Crack). The resin 2 was pelletized in the presence of 3000 ppm of processing aid Viton 100. The properties of the resin pelletized with Viton are shown in Table 2.

TABLE 2

| | Properties of the polymer fraction A | | | Properties of the polymer fraction B (calculated values) | | Properties of pellets (after two extrusions) | | |
|---|---|---|---|---|---|---|---|---|
| | MI$_2$ | density | wt % A | HLMI | density | HLMI | MI$_5$ | Density |
| Polyethylene resin 2 | 80 | 0.9710 | 48.4 | 0.238 | 0.9140 | 8.5 | 0.39 | 0.9431 |
| Polyethylene resin 2 + 3000 ppm Viton Z100 | 80 | 0.9710 | 48.4 | 0.238 | 0.9150 | 8.3 | 0.39 | 0.9436 |

The dynamic viscosity of resins 1 and 2 was measured and compared with a commercial PE100 grade, and a commercial PE100 low sag grade. The commercial PE100 grade tested was X$^{sene}$ XS 10N a Ziegler-Natta catalyzed polyethylene resin (Density 0.950 g/cm$^3$, MI$_5$ 0.3 g/10 min, no pigments: neutral) from Total Chemicals and Refining. The commercial PE100 low sag grade tested was X$^{sene}$ XLS 12B a Ziegler-Natta catalyzed polyethylene resin (Density 0.959 g/cm$^3$, MI$_5$ 0.2 g/10 min, black) from Total Chemicals and Refining. The results are shown in Table 3 and FIG. 7.

TABLE 3

| Sample | T° C. | $\eta_{0.01\ rad/s}$ (Pa * s) | $\eta_{0.1\ rad/s}$ (Pa * s) | $\eta_{1\ rad/s}$ (Pa * s) | $\eta_{10\ rad/s}$ (Pa * s) | $\eta_{100\ rad/s}$ (Pa * s) | $\omega_c$ (rad/s) | $G^*(\omega)$ (Pa) |
|---|---|---|---|---|---|---|---|---|
| XS10N | 190 | 179 000 | 93 100 | 37 500 | 10 900 | 2 400 | | |
| XLS12 | 190 | 289 000 | 120 000 | 42 300 | 11 500 | 2 480 | | |
| pellets resin 1 | 190 | 379 000 | 112 000 | 32 500 | 9 590 | 2 300 | 1.576 | 27000 |
| | 200 | | 82400 | 27200 | 8510 | 2100 | 1.990 | 27600 |
| | 210 | | 78600 | 25900 | 8210 | 2080 | 2.453 | 29300 |
| XS10N | 190 | 179 000 | 93 100 | 37 500 | 10 900 | 2 400 | | |
| XLS12 | 190 | 289 000 | 120 000 | 42 300 | 11 500 | 2 480 | | |
| pellets resin 2 | 190 | 432 000 | 125 000 | 36 200 | 10 700 | 2 520 | 1.424 | 29500 |
| | 200 | | 94400 | 31600 | 9880 | 2400 | 2.018 | 32300 |
| | 210 | | 86600 | 28500 | 8990 | 2230 | 2.194 | 30500 |
| pellets resin 2 + 3000 ppm Viton Z100 | 190 | | 107000 | 35500 | 10900 | 2570 | 1.330 | 29200 |
| | 200 | | 98700 | 32600 | 10200 | 2460 | 1.841 | 31800 |
| | 210 | | 90500 | 30000 | 9450 | 2340 | 2.194 | 32000 |

Figure 7:
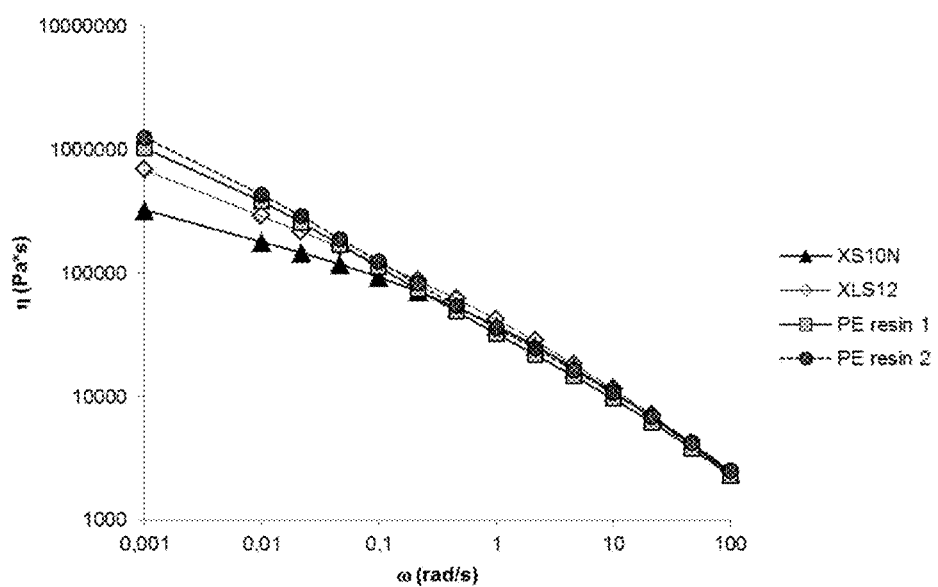
FIG. 7 represents a graph plotting the dynamical viscosity versus the frequency measured for polyethylene resin 1, polyethylene resin 2, and commercial PE100 and PE100 low sag grades, respectively.

From FIG. 7, it is evident that, in the low frequency range, resins 1 and 2 samples are more viscous than XLS12B (and thus evidently than XS10N). Resins 1 and 2 could thus be characterized as "low sag" pressure pipes grades. The polyethylene resins in accordance with the invention have an $\eta_{0.01}$ significantly greater than 200,000 Pa*s, the typical maximum value for commercially available PE100 Ziegler-Natta pipe resins, and even greater than 300,000 Pa*s. Accordingly, the resins of the invention can exhibit improved resistance to sagging for extruded pipes.

Example 2

Hydrostatic creep resistance was measured for 32 mm pipes (SRD 11) made with the polyethylene resins of the invention and compared with commercial PE100 grades. Some pipes were prepared with and without 300 ppm of Viton Z100.

Commercial PE100 grades tested were Ziegler-Natta catalyzed polyethylene resin commercially available from Total Chemicals and Refining under the name $X^{sene}$ XS 10B (Density 0.959 g/cm$^3$, MI$_5$ 0.3 g/10 min, color black), under the name $X^{sene}$ XRC 20B (Density 0.958 g/cm$^3$, MI$_5$ 0.3 g/10 min, color black), and XS 10N.

The results are shown in the Tables 4 and 5 below, and in FIGS. 1 to 3, and illustrate that polyethylene resins 3-5, optionally with a processing aid has good hydrostatic creep resistance.

TABLE 4

|  | PE pipes 32 mm | | | |
|---|---|---|---|---|
|  | 80° C. | | 20° C. | |
| Hydrostatic Stress (MPa) | 6 | 5.5 | 11.5 | 11.2 |
| XS10N | 80 | 13531 | 2397 | >8332 |
| Comp. resin 6 | 4911 | 6098 | 4419 |  |
| Comp. resin 6 + 300 ppm Viton | 6256 | >15650 | 13922 | >4006 |
| PE resin 3 + 300 ppm Viton | >15861 | 7349 | 691 | 4593 |
| PE resin 4 + 300 ppm Viton |  | >18002 | 1374 | >13970 |

TABLE 5

| Power law coefficients and extrapolated failure stress for 50 years | | | | |
|---|---|---|---|---|
| PE | ASTM density (g/cm$^3$) | A | n | Failure stress at 50 years (MPa) |
| XS10 B | 0.959 | 14.44 | 0.025 | 10.3 |
| XRC20 B | 0.958 | 13.83 | 0.024 | 10.1 |
| XS10N | 0.95 | 13.89 | 0.025 | 10.04 |
| Comp. Resin 6 | 0.9498 | 13.62 | 0.021 | 10.37 |
| Comp. Resin 6 + 300 ppm Viton | 0.950 | 13.32 | 0.016 | 10.83 |
| PE resin 3 + 300 ppm Viton | 0.946 | 13.44 | 0.022 | 10.1 |
| PE resin 3 + 300 ppm Viton (12.5 MPa excluded) | 0.946 | 12.94 | 0.0174 | 10.32 |
| PE resin 4 + 300 ppm Viton | 0.945 | 13.35 | 0.021 | 10.16 |
| PE resin 4 + 300 ppm Viton (12.5 MPA excluded) | 0.945 | 12.837 | 0.0152 | 10.37 |

Stress (s)
A * t$^{(-n)}$
t: pipe lifetime

The behavior at 80° C. (FIG. 1) show that pipes according to the invention have better high temperature creep resistance than PE100 XS10N.

Figure 2:
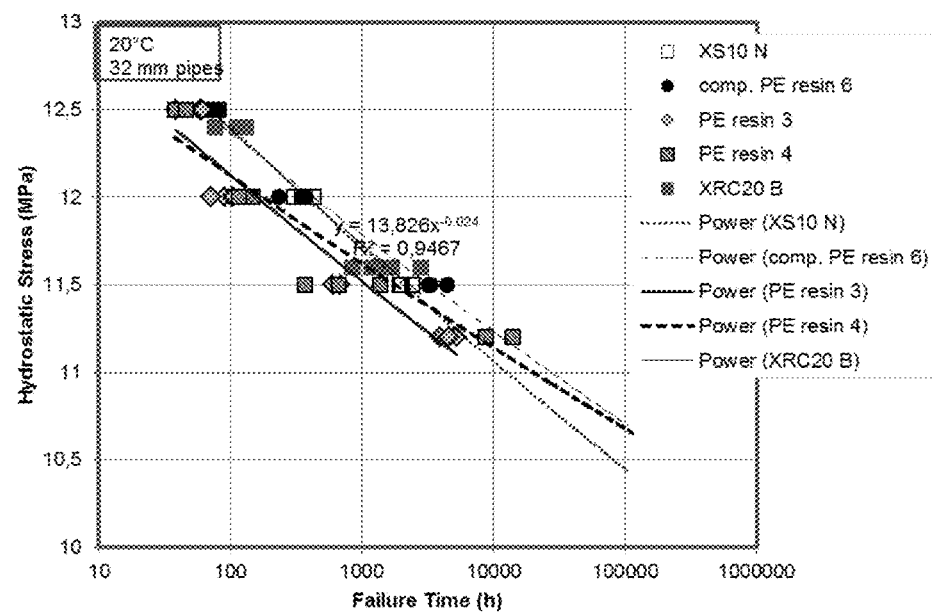
FIG. 2 represents a graph plotting hydrostatic stress versus failure time for 32 mm pipes under hydrostatic pressure at 20° C. made from polyethylene resin 3, polyethylene resin 4, comparative polyethylene resin 6, and commercial resins XS10N and XRC20B, respectively.
Figure 3:
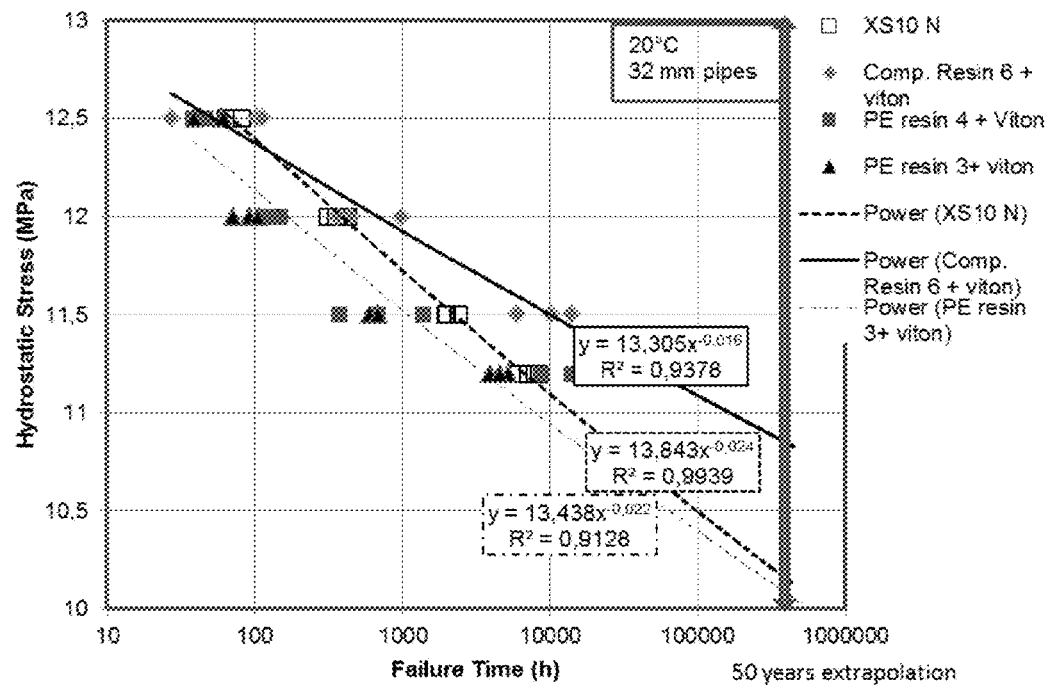
FIG. 3 represents a graph plotting hydrostatic stress versus failure time for 32 mm pipes under hydrostatic pressure at 20° C. made from polyethylene resin 3+Viton, polyethylene resin 4+Viton, comparative polyethylene resin 6+Viton and commercial resin XS10N, respectively.
Figure 5:
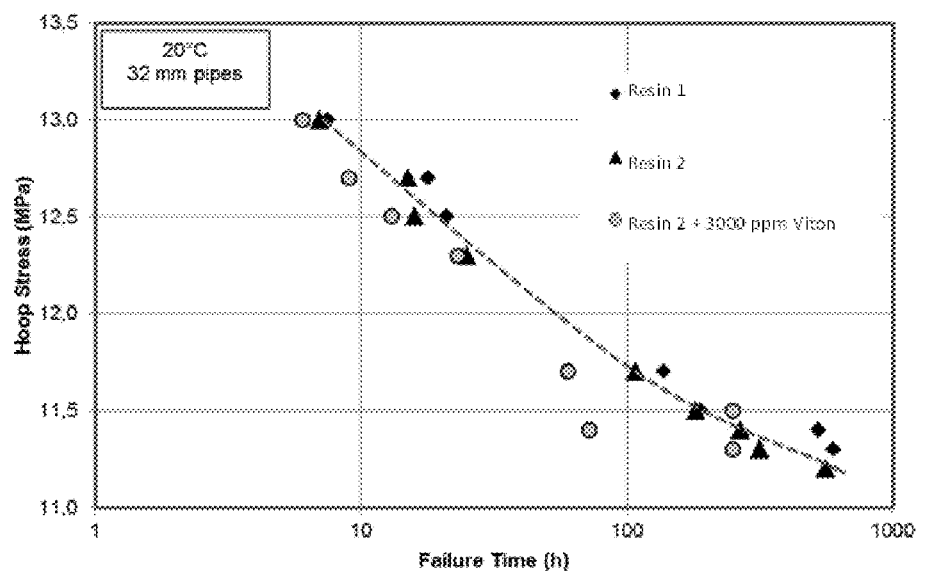
FIG. 5 represents a graph plotting hydrostatic stress versus failure time at 20° C. for polyethylene resins 1, 2, and polyethylene resin 2+Viton.

FIGS. 2, 3 and 5 report hydrostatic creep behavior in comparison with PE100 pipe resins at 20° C. After 5000 h lifetime, resins 3 and 4 perform better than XS10 N resins (based on extrapolated failure stress value) although their ASTM density values are much lower. Similarly, resins 1 and 2 perform also better. From these data, it is clear that the resins of the inventions allow preparing flexible low sagging PE 100 RC-RT pipes.

Example 3

Figure 4:
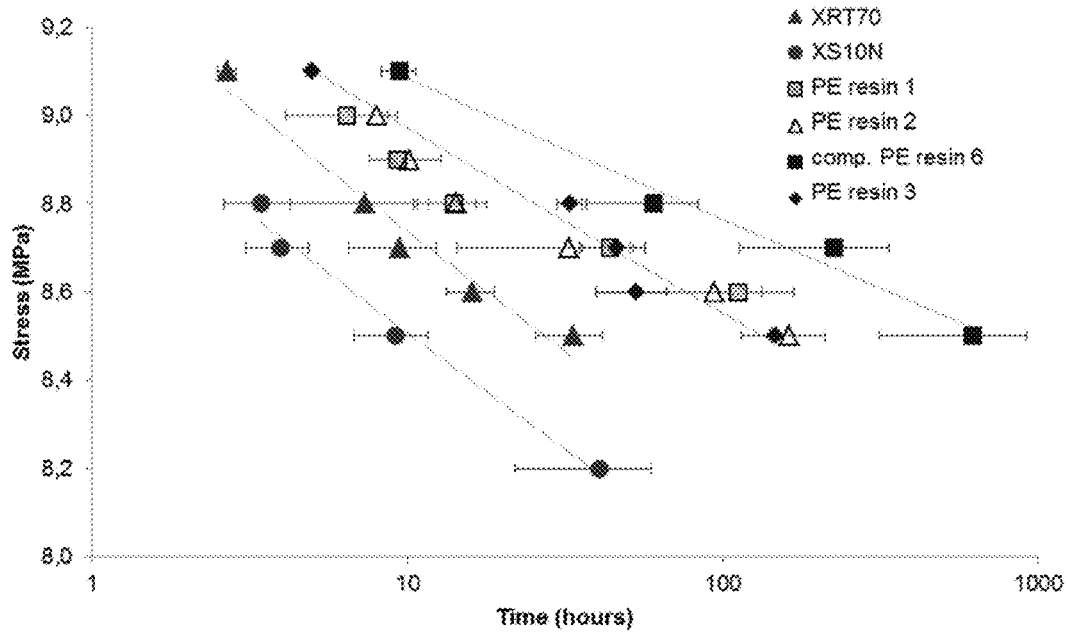
FIG. 4 represents a graph plotting the stress measured at 50° C. as a function of time for polyethylene resins 1-3 and comparative polyethylene resin 6.

An accelerated creep test at 50° C. was developed to rapidly simulate the ductile part of the pressure pipes regression curve. ISO 527 type 5A tensile bars were prepared using the tested resin by compression molding. The tests were run as follows: to the tensile bars, which were held at a constant temperature of 50° C. throughout the test, a steady tensile load was applied. The results of this experiment are shown in FIG. 4 which shows ductile part of the pressure pipes regression curve as simulated by the creep experiments performed at 50° C. It can be seen that grades according to the invention are all better than commercial grades XS10N and XRT70. XRT70 is a commercial Ziegler-Natta catalyzed RT polyethylene grade from Total Chemicals and Refining (Density 0.947 g/cm$^3$, MI$_5$ 0.7 g/10 min).

Example 4

The flexion test used to characterize the pipe flexibility has been adapted from the ISO 178 three-point bending test, as described herein above, the results were compared with the data measured for commercially available PE100 and PE80 pipes. 3802 B is a commercial PE80 polyethylene grade from Total Chemicals and Refining (Density 0.948 g/cm$^3$, MI$_5$ 0.9 g/10 min, color black), 3802 Y31 is a commercial PE80 polyethylene grade from Total Chemicals and Refining (Density 0.940 g/cm$^3$, MI$_5$ 0.9 g/10 min, color yellow).

Figure 6:
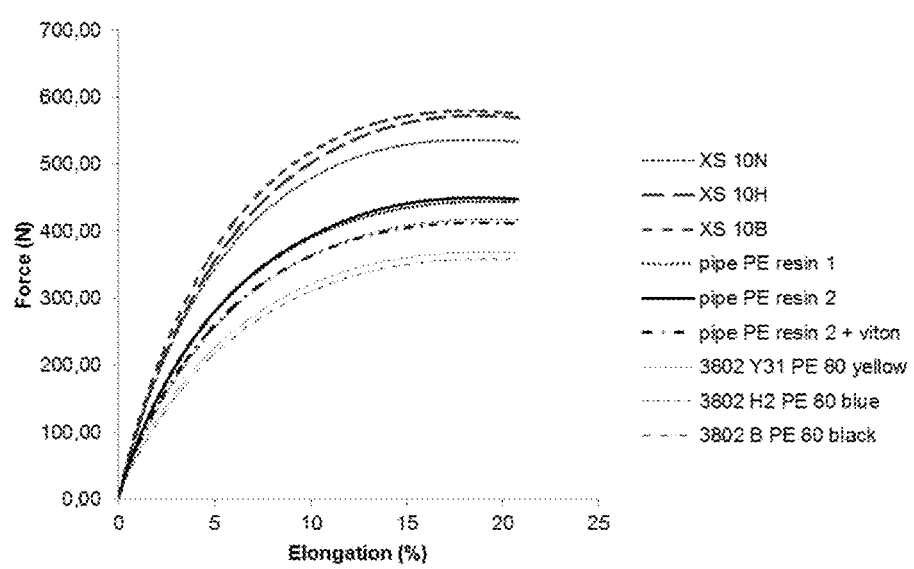
FIG. 6 represents a graph plotting the force in N versus the deformation in % measured for samples made of polyethylene resin 1, polyethylene resin 2, and polyethylene resin 2+Viton, and commercial PE100 and PE 80 grades, respectively.

The force as a function of the elongation was recorded and the results are shown in FIG. 6. The lower the force, the more flexible was the pipe. From comparison with PE80 and PE100 "32 mm" known pressure pipes, pipes comprising polyethylene resins 1 and 2 appear as quite similar to PE80. In fact, their behaviors are all located "in the upper part" of the PE80 range of flexibility, as shown by the flexion curves in FIG. 6.

The invention claimed is:

1. A pipe comprising at least one metallocene-catalyzed polyethylene resin, wherein the polyethylene resin has a multimodal molecular weight distribution and comprises at least two metallocene-catalyzed polyethylene fractions A and B, wherein fractions A and B are prepared in different reactors of at least two reactors connected in series, wherein the polyethylene resin comprises:

at least 30% by weight and at most 50% by weight of the polyethylene fraction A, based on the total weight of the polyethylene resin, wherein fraction A has a melt index MI$_2$ of at least 50 g/10 min as determined on the fluff of fraction A according to ISO 1133:1997 condition D at a temperature of 190° C. and under a load of 2.16 kg;

wherein the polyethylene resin has a melt index MI$_5$ of at least 0.10 g/10 min and of at most 1.0 g/10 min as determined according to ISO 1133:1997, condition T, at 190° C. and under a load of 5 kg; an HLMI of at least 4.0 g/10 min and at most 14.0 g/10 min, as measured according to the procedure of ISO 1133:1997 condition G with a temperature of 190° C. and a load of 21.6 kg; and a density of at least 0.9420 g/cm$^3$ and of at most 0.9460 g/cm³ as determined according to the procedure of ASTM D-1505 at a temperature of 23° C.; and
wherein fraction B has a density of at most 0.9210 g/cm³.

2. The pipe according to claim 1, wherein the polyethylene resin has a density of at most 0.9455 g/cm³ as determined according to the procedure of ASTM D-1505 at a temperature of 23° C.

3. The pipe according to claim 1, wherein fraction B has a density of at most 0.9200 g/cm³.

4. The pipe according to claim 1, wherein the polyethylene resin has a molecular weight distribution Mw/Mn of at least 5.0, Mw being the weight-average molecular weight and Mn being the number-average molecular weight.

5. The pipe according to claim 1, wherein the ratio of the HLMI of the polyethylene resin to the HLMI of the polyethylene fraction B is at most 50, the HLMI of the polyethylene resin and of fraction A being determined according to the procedure of ISO 1133:1997 condition G with a temperature of 190° C. and a load of 21.6 kg, and the HLMI of polyethylene fraction B being calculated with the formula:

$$HLMI = 0.894 * W_B * Ln(HLMI_B) - 5.61 * (W_B)^2 + 0.9304 * Ln(HLMI_A) - 0.0877 * (W_B * Ln(HLMI_A))^2$$

wherein HLMI is the HLMI of the polyethylene resin, $W_A$ is the weight fraction of fraction A, $HLMI_A$ is the HLMI of fraction A measured on the fluff, $HLMI_B$ is the HLMI of fraction B as calculated, and wherein the sum of both fractions A and B by weight ($W_A + W_B$) is 1.

6. The pipe according to claim 1 comprising at least 50% by weight and at most 70% by weight of polyethylene fraction B.

7. The pipe according to claim 1, wherein the ratio of the HLMI of the polyethylene resin to the HLMI of polyethylene fraction B is at least 10 and at most 50, the HLMI of the polyethylene resin and of fraction A being determined according to the procedure of ISO 1133:1997 condition G with a temperature of 190° C. and a load of 21.6 kg, and the HLMI of polyethylene fraction B being calculated with the formula:

$$HLMI = 0.894 * W_B * Ln(HLMI_B) - 5.61 * (W_B)^2 + 0.9304 * Ln(_{HLMI_A}) - 0.0877 * (W_B * Ln(HLMI_A))^2$$

wherein HLMI is the HLMI of the polyethylene resin, $W_A$ is the weight fraction of fraction A, $HLMI_A$ is the HLMI of fraction A measured on the fluff, $HLMI_B$ is the HLMI of fraction B as calculated, and wherein the sum of both fractions A and B by weight ($W_A + W_B$) is 1.

8. The pipe according to any one of claims 1 to 7, wherein fraction A has an $MI_2$ of at least 60 g/10 min and of at most 250 g/10 min.

9. The pipe according to claim 1, wherein the polyethylene resin has a molecular weight distribution Mw/Mn of at most 14.0, Mw being the weight-average molecular weight and Mn being the number-average molecular weight.

10. The pipe according to claim 1, wherein the polyethylene resin has a molecular weight distribution Mw/Mn of at least 5.0 and at most 12.0, preferably of at least 6.5 and at most 9.0, Mw being the weight-average molecular weight and Mn being the number-average molecular weight.

11. The pipe according to claim 1, wherein the polyethylene resin has stress crack resistance of at least 6400 hours, preferably at least 8760 hours, preferably at least 10000 hours, as determined using the Full Notched Creep Test according to ISO 16770 performed at 80° C. under a 4.0 MPa constraint in 2% Arkopal N100.

12. The pipe according to claim 1, wherein the polyethylene resin further comprises at least one processing aid.

13. The pipe according to claim 1, wherein the polyethylene resin further comprises at least 100 ppm of at least one processing aid, preferably a silicon- or fluorine-based processing aid, for example a fluoroelastomer.

14. A metallocene-catalyzed polyethylene resin, wherein the polyethylene resin has a multimodal molecular weight distribution and comprises at least two metallocene-catalyzed polyethylene fractions A and B, wherein fractions A and B are prepared in different reactors of at least two reactors connected in series, wherein the polyethylene resin comprises:
at least 30% by weight and at most 50% by weight of the polyethylene fraction A, based on the total weight of the polyethylene resin, wherein fraction A has a melt index $MI_2$ of at least 50 g/10 min as determined on the fluff of fraction A according to ISO 1133:1997 condition D at a temperature of 190° C. and under a load of 2.16 kg;
wherein the polyethylene resin has a melt index $MI_5$ of at least 0.10 g/10 min and of at most 1.0 g/10 min as determined according to ISO 1133:1997, condition T, at 190° C. and under a load of 5 kg; an HLMI of at least 4.0 g/10 min and at most 14.0 g/10 min, the HLMI being determined according to the procedure of ISO 1133:1997 condition G with a temperature of 190° C. and a load of 21.6 kg; and a density of at least 0.9420 g/cm³ and of at most 0.9460 g/cm³ as determined according to the procedure of ASTM D-1505 at a temperature of 23° C.; and wherein fraction B has a density of at most 0.9210 g/cm³, preferably at most 0.9200 g/cm³.

15. The metallocene-catalyzed polyethylene resin according to claim 14, wherein the polyethylene resin has a density of at most 0.9455 g/cm³ as determined according to the procedure of ASTM D-1505 at a temperature of 23°.

* * * * *